(12) United States Patent
Matsumoto et al.

(10) Patent No.: US 11,846,731 B2
(45) Date of Patent: Dec. 19, 2023

(54) DISTANCE DETECTION DEVICE AND IMAGING APPARATUS

(71) Applicant: CANON KABUSHIKI KAISHA, Tokyo (JP)

(72) Inventors: Kohei Matsumoto, Yokohama (JP); Katsuhiro Doshin, Yokohama (JP); Ayumu Nemoto, Tokyo (JP); Dai Naito, Yokohama (JP); Yuto Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 16/942,359

(22) Filed: Jul. 29, 2020

(65) Prior Publication Data
US 2021/0033710 A1    Feb. 4, 2021

(30) Foreign Application Priority Data

Jul. 31, 2019  (JP) .................................. 2019-141086
Jul. 28, 2020  (JP) .................................. 2020-127511

(51) Int. Cl.
*G01S 7/00*        (2006.01)
*G01S 7/4865*    (2020.01)
(Continued)

(52) U.S. Cl.
CPC .......... *G01S 7/4865* (2013.01); *G01S 7/4815* (2013.01); *G01S 17/10* (2013.01); *G01S 17/894* (2020.01);
(Continued)

(58) Field of Classification Search
USPC ................................................ 356/4.01, 5.01
See application file for complete search history.

(56) References Cited

U.S. PATENT DOCUMENTS

| 4,556,304 A | 12/1985 | Fukuda |
| 6,108,495 A | 8/2000 | Takahata et al. |
| (Continued) | | |

FOREIGN PATENT DOCUMENTS

| CN | 108431632 A | 8/2018 |
| CN | 109270534 A | 1/2019 |
| (Continued) | | |

OTHER PUBLICATIONS

Cited in a Jun. 10, 2021 European Search Report, which is enclosed, that issued in European Application No. 20 18 8540.7.
(Continued)

*Primary Examiner* — James R Hulka
(74) *Attorney, Agent, or Firm* — Cowan, Liebowitz & Latman, P.C.

(57) ABSTRACT

Provided is a distance detection device attached to a position at which it surrounds a camera lens device. The distance detection device has a light emitting element configured to irradiate a target region with irradiation light and a light receiving element configured to receive reflected light of the irradiation light from a target in the target region. The distance detection device acquires distance information indicating a distance to the target on the basis of a time until the light receiving element receives the reflected light after the light emitting element performs irradiation with the irradiation light and communicates the distance information.

33 Claims, 24 Drawing Sheets

(51) Int. Cl.
*G01S 17/10* (2020.01)
*G01S 17/894* (2020.01)
*G01S 7/481* (2006.01)
*H04N 23/55* (2023.01)
*H04N 23/56* (2023.01)
*H04N 23/63* (2023.01)

(52) U.S. Cl.
CPC ............. *H04N 23/55* (2023.01); *H04N 23/56* (2023.01); *H04N 23/633* (2023.01)

(56) References Cited

U.S. PATENT DOCUMENTS

| | | | |
|---|---|---|---|
| 7,116,371 B2 | 10/2006 | Kakiuchi et al. | |
| 10,379,135 B2* | 8/2019 | Maryfield | F41G 3/065 |
| 11,506,789 B2* | 11/2022 | Fujita | G01S 17/88 |
| 2003/0043287 A1* | 3/2003 | Kakiuchi | G01S 7/4811 |
| | | | 348/136 |
| 2005/0041143 A1* | 2/2005 | Kakiuchi | G01S 7/4813 |
| | | | 348/370 |
| 2018/0364272 A1 | 12/2018 | Maryfield et al. | |
| 2019/0129037 A1 | 5/2019 | Fujita et al. | |

FOREIGN PATENT DOCUMENTS

| | | |
|---|---|---|
| CN | 110022435 A | 7/2019 |
| EP | 3505961 A1 | 7/2019 |
| JP | 2002-303784 A | 10/2002 |
| JP | 2014-115191 A | 6/2014 |
| JP | 2014-157044 A | 8/2014 |

OTHER PUBLICATIONS

Cited in a Taiwan Office Action dated Nov. 11, 2022, which is enclosed with a translation, that issued in the corresponding Taiwanese Patent Application No. 109125725.

Cited in a Partial European Search Report dated Jan. 18, 2021, which is enclosed, that issued in the corresponding European Patent Application No. 20188540.7.

Cited in an Aug. 1, 2023 Chinese Office Action, which is enclosed with English Translation, that issued in Chinese Patent Application No. 202010759975.8.

* cited by examiner

: LIGHT RECEIVING SIGNAL WIRING

: LIGHT EMITTING SIGNAL WIRING

: GND WIRING

: SCANNING SIGNAL WIRING
: LIGHT EMITTING SIGNAL WIRING
: GND WIRING
: INSULATING LAYER
: COVER LAY

DISTANCE DETECTION DEVICE AND IMAGING APPARATUS

BACKGROUND OF THE INVENTION

Field of the Invention

The present invention relates to a distance detection device configured to acquire distance information of an object.

Description of the Related Art

With the spread of smartphones and the like, opportunities for imaging and the number of photos taken have significantly increased, and image quality and a sense of resolution of captured images have improved with the advancement of peripheral technologies. In order to further enhance image quality and a sense of resolution, there is a technology of acquiring distance information (image depth information) from an imaging apparatus to an object for each pixel. It is possible to acquire the distance information before image capturing, to thereby increase a speed of automatic focus adjustment (AF), to perform image capturing assistance such as complementing of locations where blown out highlights, blocked out shadows, and the like have occurred, and to perform three-dimensional image expression of two-dimensional images. It is possible to use the distance information at the time of image capturing to set a contrast difference between a background and an image of a main object, to emphasize an outline of the main object, and to adjust shading generated by external light directed to the main object. It is possible to use the distance information retained at the time of image capturing to perform image processing to change the direction of the external light, with which the main object is irradiated, and to perform the aforementioned complementing after the image capturing. Also, the distance information is used for three-dimensional space mapping in the fields of multi-view imaging, augmented reality, virtual reality, and the like. A distance image for acquiring distance information from an image or a video is an image representing distance information of the object for each pixel.

The time of flight (TOF) scheme is a method of performing irradiation with distance measurement light from an imaging apparatus toward an object and calculating the distance on the basis of a time required by an imaging element for acquiring a distance image to receive the reflected light thereof. For example, an object is irradiated with infrared light with intensity modulated in a predetermined irradiation pattern. The infrared light reflected by the object is received by the imaging element, and a time difference between a timing of the irradiation in the irradiation pattern and a timing of the light reception is detected, and thereby a distance value is calculated. The distance value is collected in a bit map manner for each pixel and is saved as distance image data. The apparatus disclosed in Japanese Patent Laid-Open No. 2014-157044 is adapted such that an irradiation direction of a distance measurement light irradiator disposed in an imaging apparatus main body is changed using an actuator and an entire imaging range is irradiated with distance measurement light. It is possible to accurately acquire the distance image in the entire captured image regardless of an imaging angle that the user employs for image capturing.

FIG. 24 is a diagram illustrating an example of a side surface of an imaging apparatus with a distance measurement light irradiator disposed therein and a distance image. As illustrated in FIG. 24A, an imaging apparatus main body 100 is provided with a distance measurement light irradiator 301. In order to acquire a distance image, it is necessary for distance measurement light 354 emitted from the distance measurement light irradiator 301 for irradiation to reach an object. If the distance measurement light irradiator 301 is disposed in the imaging apparatus main body 100 in accordance with details disclosed in Japanese Patent Laid-Open No. 2014-157044, the distance measurement light 354 is blocked by a lens barrel 200 provided in the imaging apparatus main body 100 and does not reach the object (vignetting occurs).

FIG. 24B illustrates a distance image 359 in a case in which the distance measurement light 354 is blocked by the lens barrel 200. In a case in which a region that is not irradiated with the distance measurement light 354 is present in an image angle region including the object, an imaging element for acquiring a distance image cannot receive the distance measurement light 354 in the range of the region that is not irradiated. In FIG. 24B, the region, which is not irradiated with the distance measurement light 354, in which the distance image cannot be acquired, is illustrated as a region 365. The region 365 is output as being at infinity.

SUMMARY OF THE INVENTION

An object of the present invention is to provide a distance detection device attached to an imaging apparatus and capable of irradiating a target with irradiation light for detecting a distance to an object without allowing any configuration members such as a lens barrel included in the imaging apparatus to block the irradiation light.

According to an embodiment of the present invention, there is provided a distance detection device including: a light emitting unit configured to irradiate a target region with irradiation light; a light receiving unit configured to receive reflected light of the irradiation light from a target in the target region; an acquisition unit configured to acquire distance information indicating a distance to the target on the basis of a time until the light receiving unit receives the reflected light after the light emitting unit performs the irradiation with the irradiation light; and a communication unit configured to communicate the distance information, in which the distance detection device is attached to a lens device included in an imaging apparatus at a position at which it surrounds the lens device.

Further features of the present invention will become apparent from the following description of exemplary embodiments with reference to the attached drawings.

DESCRIPTION OF THE EMBODIMENTS

Hereinafter, preferred embodiments of the present invention will be described in detail on the basis of the accompanying drawings. In each embodiment, an example of a camera system 1 in which a distance detection device 300 is attached to a lens device 200 included in an imaging apparatus 100 (hereinafter, also referred to as a camera) will be described.

First Embodiment

Figure 1:
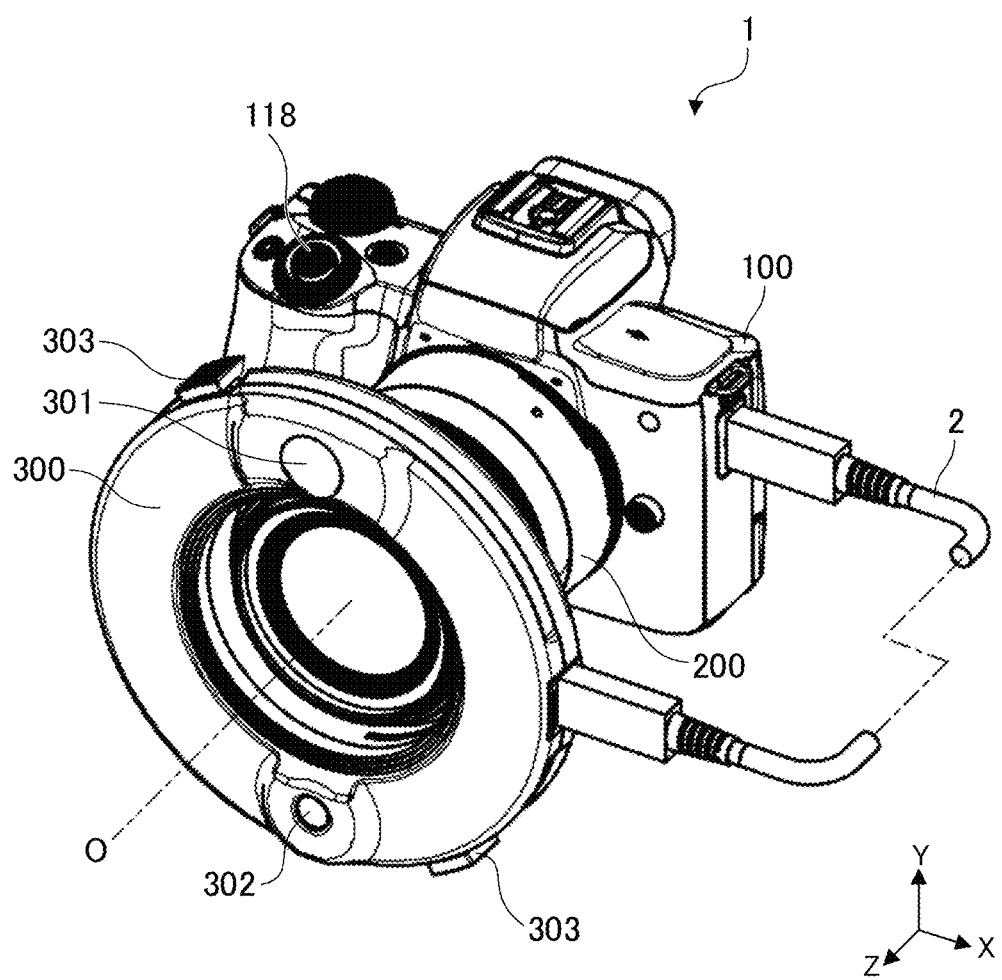
FIG. 1 is an exterior perspective view of a camera system.

Referring to FIGS. 1 to 6, a first embodiment of the present invention will be described. FIG. 1 is an exterior perspective view of the camera system 1. For convenience of explanation, an X axis and a Z axis that perpendicularly intersect one another will be defined on a bottom surface of the camera 100, and an axis that perpendicularly intersects the X axis and the Z axis will be defined as a Y axis. The direction of an optical axis O of the camera 100 is a direction parallel to the Z axis, and an object side will be defined as a front side. Also, the side that is closer to the optical axis O in a radial direction from the optical axis O of the lens device 200 at the center will be defined as an inner peripheral side or the inside in the radial direction while the side away from the optical axis will be defined as an outer peripheral side or the outside in the radial direction.

The lens device 200 is provided on the front surface of the camera 100. The distance detection device 300 is attached at a position at which it surrounds a periphery (outer periphery) of the lens device 200 with an attachment mechanism (not illustrated) at an end (front end) of the lens device 200 on the object side. The lens device 200 may be attached to and detached from a main body of the camera 100, or both the lens device 200 and the camera 100 may be integrally configured.

The distance detection device 300 can be attached to or detached from the lens device 200 or is configured integrally with the lens device 200. For example, the distance detection device 300 is attached such that the central axis thereof substantially conforms to the optical axis O of the imaging optical system included in the lens device 200. Therefore, the term "optical axis O" used for description in regard to the distance detection device 300 below can appropriately be interpreted as equivalent to the central axis of the distance detection device 300. The distance detection device 300 has an annular shape around the optical axis O at the center and includes a light emitting unit 301 and a light receiving unit 302. A front lens of the lens device 200 is exposed forward from an opening of the distance detection device 300. The distance detection device 300 is electrically connected to the camera 100 via a cable 2 and performs communication of various kinds of information and power supply.

Since the distance detection device 300 is disposed to surround the periphery of the front end of the lens device 200, vignetting due to an obstacle such as the lens device 200 does not occur in irradiation light (distance measurement light) of the distance detection device 300. Irradiation is performed in an image angle region of the imaging apparatus, and the distance measurement light is received by an imaging unit for acquiring a distance image, thereby obtaining a distance image. The distance image is an image representing distance information indicating the distance between the camera 100 and the object.

Figure 2:
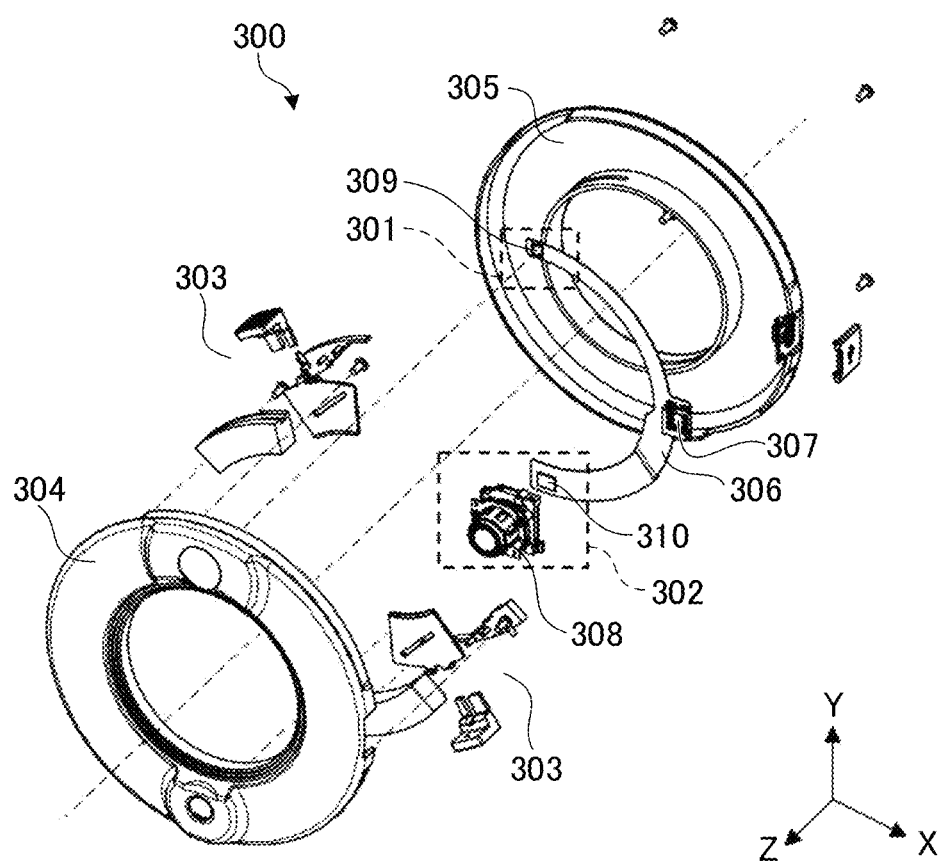
FIG. 2 is an exploded perspective view for explaining a distance detection device.

FIG. 2 is an exploded perspective view of the distance detection device 300. The distance detection device 300 includes a front cover 304, a light emitting unit 301, a light receiving unit 302, a flexible printed circuit (hereinafter abbreviated to FPC) 306, a connection terminal 307, attachment mechanisms 303, and a rear cover 305.

The light emitting unit 301 irradiates a target region with irradiation light. The light emitting unit 301 includes a light emitting element 309. The light receiving unit 302 includes a light receiving element (TOF sensor) 310 and a lens unit 308. The lens unit 308 includes an image formation lens disposed on the front surface side of the light receiving element 310, that is, on the side of the object that is a target in the target region.

The light emitting element 309, the light receiving element 310, and a control IC (TOF-CPU) 350 (FIG. 3) are electrically connected to the FPC 306. The control IC (TOF-CPU) 350 controls the light emitting element 309 and the light receiving element 310. The connection terminal 307 is mounted on the FPC 306 and is exposed to the outside at a boundary between the front cover 304 and the rear cover 305 in a state in which the front cover 304 and the rear cover 305 are fastened and secured to each other with a screw or the like. The attachment mechanisms 303 function as detachable units used by the distance detection device 300 to be attached to and detached from the lens device 200. It is possible to perform attachment between the lens device 200 and the distance detection device 300 by sliding an operation lever that is an operation member in the attachment mechanisms 303.

Figure 3:
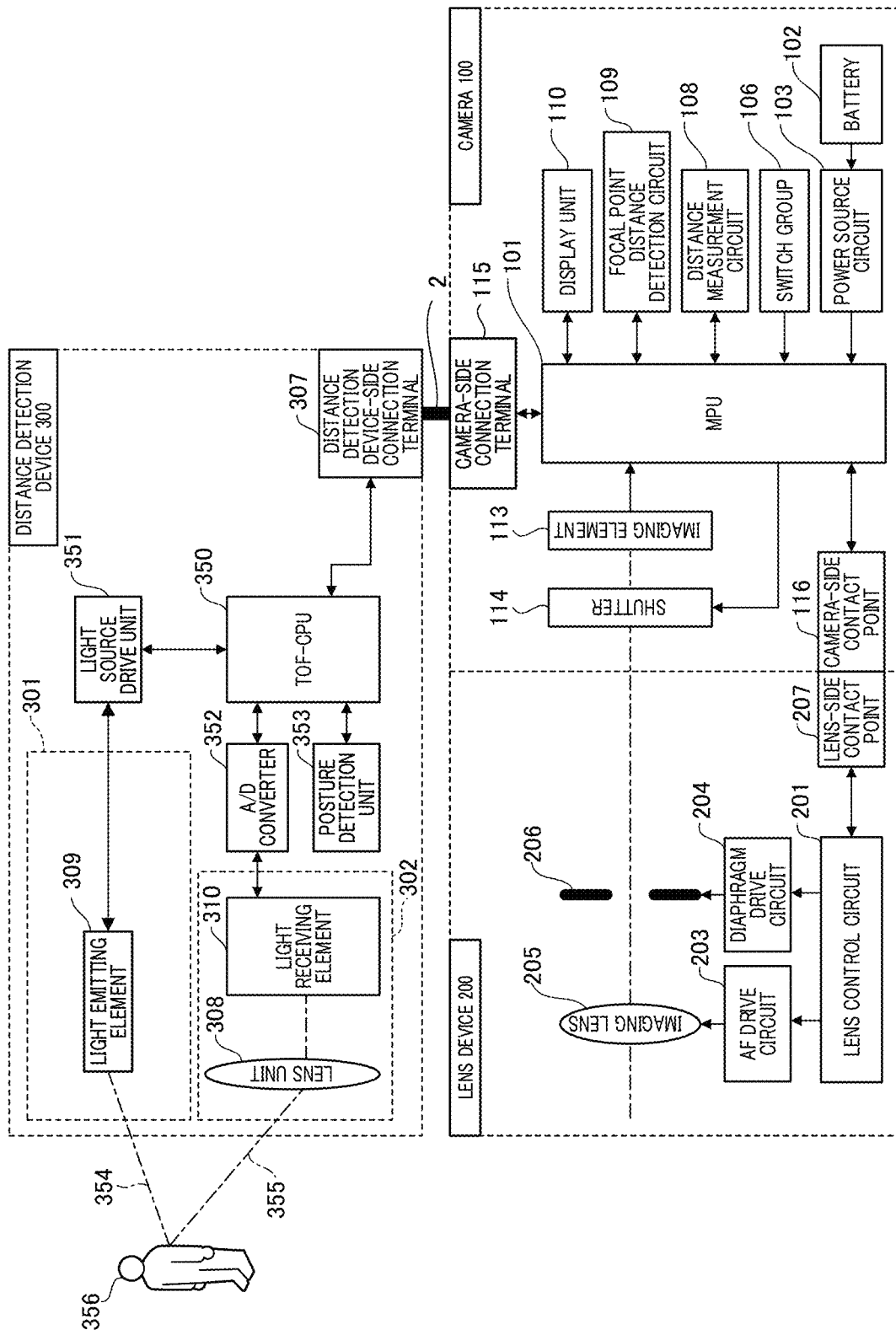
FIG. 3 is a diagram for explaining a circuit configuration of the camera system.

FIG. 3 is a block diagram illustrating a main electrical configuration of the camera system 1 according to the embodiment. First, configurations of the camera 100 and the lens device 200 will be described. The camera 100 has an MPU 101 to a diaphragm device 206. A microcomputer (hereinafter, referred to as an "MPU") 101 incorporated in a main body of the camera 100 serves to control operations of the camera 100. The MPU 101 executes various kinds of processing and instructions for various components. The MPU 101 has a one-chip IC circuit configuration with a built-in microcomputer including a central processing unit (CPU), a read only memory (ROM), a random access memory (RAM), an input/output control circuit (I/O CONTROL), a multiplexer, a timer circuit, and the like. The MPU 101 can control the camera system 1 using software. A battery 102 is a power source of the camera 100 and is connected to a power source circuit 103. The power source circuit 103 supplies an output voltage to each circuit, which will be described later.

A switch group 106 includes a switch (SW1) that is turned on through a half-pressing operation of a release button 118, for example, and a switch (SW2) that is turned on through a full-pressing operation of the release button 118. Also, the switch group 106 includes various operation switches such as switches for setting exposure (a diaphragm and a shutter speed setting SW). Signals from the switch group 106 are acquired by the MPU 101.

A distance measurement circuit 108 measures the object distance and outputs measurement data to the MPU 101. In regard to a method for measuring the object distance, it is possible to acquire object distance information by emitting light for irradiation from the side of the camera 100 and receiving reflected light from the object in an active scheme, for example. In a passive scheme, it is possible to detect object distance information by reading an image signal from an imaging sensor such as a line sensor or the like provided in a manner corresponding to a screen and performing an arithmetic operation in a phase difference detection scheme from a focal point position corresponding to an object image. Also, the distance measurement circuit 108 can perform detection of feature regions such as face detection and pupil detection in a case in which the object is a person.

The MPU 101 performs communication with the lens device 200 via a camera-side contact point 116 and a lens-side contact point 207. A lens control circuit 201 included in the lens device 200 performs communication with the MPU 101, drives an imaging lens 205 via an autofocus (AF) drive circuit 203, and performs focal point adjustment. Although FIG. 3 illustrates only one imaging lens 205 for convenience, the imaging optical system is actually configured of a group of multiple lenses such as a focus lens. The AF drive circuit 203 includes a stepping motor, for example, and changes the position of the focus lens in response to a control command from the lens control circuit 201, thereby adjusting a focal point. Also, the lens control circuit 201 drives the diaphragm device 206 via a diaphragm drive circuit 204, thereby controlling exposure. The diaphragm drive circuit 204 includes an autoiris, for example, and changes an aperture diameter of the diaphragm device 206 in response to a control command from the lens control circuit 201, thereby optically adjusting a diaphragm value.

A focal point distance detection circuit 109 included in the main body of the camera 100 outputs focal point distance information of the imaging lens 205 to the MPU 101. In a case in which the imaging lens 205 is a single-focal-point lens, for example, data indicating a fixed focal point distance is sent to the MPU 101. Also, in a case in which the imaging lens 205 is a zoom lens, data indicating a focal point distance in accordance with a zooming stop position of the imaging lens 205 detected by a zoom encoder (not illustrated) is sent to the MPU 101.

A display unit 110 includes a display device such as a liquid crystal display (LCD), a liquid crystal view finder (EVF), or an organic EL display and displays information regarding image capturing, image information, and the like. Note that an organic EL or the like is used for the display unit 110.

A shutter 114 is provided on the front surface side of an imaging element 113 and can move to a position at which the imaging element 113 is brought into a light blocking state and a position at which the imaging element 113 is brought into an exposure state. An image sensor using a charge coupled device (CCD) or a complementary metal oxide semiconductor (CMOS) is used for the imaging element 113 and outputs an image signal in accordance with a light flux received at the time of exposure through photoelectric conversion. In this manner, the object is imaged.

A cable 2 is a connection member configured to connect a connection terminal 115 on the side of the camera main body to a connection terminal 307 on the side of the distance detection device 300. The MPU 101 and the TOF-CPU 350 perform mutual communication via the cable 2, the connection terminal 115, and the connection terminal 307, and power can be supplied from the camera main body to the distance detection device 300. In other words, the connection terminal 307 is a first communication unit configured to communicate various kinds of information (for example, distance information) to the camera 100 while the connection terminal 115 is a second communication unit configured to communicate various kinds of information to the distance detection device 300. Although the camera main body includes the battery 102 in the embodiment, a configuration in which the distance detection device 300 is also provided with a battery may be employed.

Next, a circuit configuration of the distance detection device 300 will be described. The distance detection device 300 has the light emitting unit 301 to a posture detection unit 353. The light emitting unit 301 has the light emitting element 309. The light receiving unit 302 has the light receiving element 310 and a lens unit 308. The TOF-CPU 350 controls the entire distance detection device 300. The light emitting unit 301 is electrically connected to a light source drive unit 351, and the light source drive unit 351 causes the light emitting element 309 to emit light in response to a control signal from the TOF-CPU 350. A light emitting diode (LED), a vertical cavity surface emitting laser (VCSEL), or the like is typically used for the light emitting element 309, and a wavelength region of light to be used is a region of invisible light such as near-infrared light.

An object 356 is a target in the irradiation target region. The irradiation light 354 is reflected by the object 356, and reflected light 355 thereof is received by the light receiving unit 302. The light receiving unit 302 includes the lens unit 308 and the light receiving element 310. After an image of the reflected light 355 from the object 356 is formed at the lens unit 308, the light receiving element 310 receives the light, performs photoelectrical conversion, and outputs an analog signal for generating a distance image. The analog signal output by the light receiving element 310 is acquired and converted into a digital signal by an A/D converter 352.

The digital signal is transmitted to the TOF-CPU 350. The posture detection unit 353 includes a level function such as an angular speed sensor, an acceleration sensor, or an inclination sensor, detects posture information of the distance detection device 300, and outputs the detection signal to the TOF-CPU 350. It is possible to adjust attachment between the camera 100 and the distance detection device 300 on the basis of the posture information.

Distance detection using the light emitting unit 301 and the light receiving unit 302 is performed by the TOF-CPU 350 transmitting a control signal to each part in response to a command from the MPU 101 of the camera 100. In a case in which turning-on of a power source switch included in the switch group 106 is detected, for example, the display unit 110 performs, on the screen, first live view display using the imaging element 113 of the camera 100 and second live view display using the light receiving element 310 of the distance detection device 300. In regard to the live view display performed by the distance detection device 300, it is possible to change a display state and display details by stopping irradiation of the object from the light emitting element 309 or adjusting the amount of irradiation with the irradiation light 354. As a method for displaying an image using the display unit 110, a method of displaying the first live view display and the second live view display in two split screens and a method of displaying the display images in a superimposed manner are exemplified. Alternatively, there is a method of arbitrarily selecting and displaying either the first live view display or the second live view display or the like.

When a full pressing operation is performed on the release button 118 and the switch (SW2) is turned on, an imaging operation of the camera 100 and an imaging operation of the distance detection device 300 are started, in the camera system 1. Alternatively, when a half pressing operation is performed on the release button 118 and the switch (SW1) is turned on, an instruction for preparing for the irradiation of the light emitting unit 301 is provided, and power is supplied. It is possible to cause the switch (SW1) and the switch (SW2) to selectively have functions as needed. For example, the imaging operation of the distance detection device 300 can be started through an operation of turning on the switch (SW1), and the imaging operation of the camera 100 can be started through an operation of turning on the switch (SW2).

The TOF-CPU 350 transmits the digital signal acquired from the A/D converter 352, that is, a signal corresponding to the distance image data, to the MPU 101 via the connection terminal 307 on the side of the distance detection device, the cable 2, and the connection terminal 115 on the side of the camera.

The MPU 101 acquires an image captured by the camera 100 and a distance image captured by the distance detection device 300 and performs image processing thereon. The MPU 101 generates data of a three-dimensional image by performing synthesis processing of the captured image and the distance image and saves the data in a recording device (not illustrated). As saving methods, a method of saving the three-dimensional image data after the synthesis, a method of applying the distance image to the captured image and saving the data, a method of separately saving each of the data of the captured image and the distance image, and the like are exemplified.

Figure 4A:
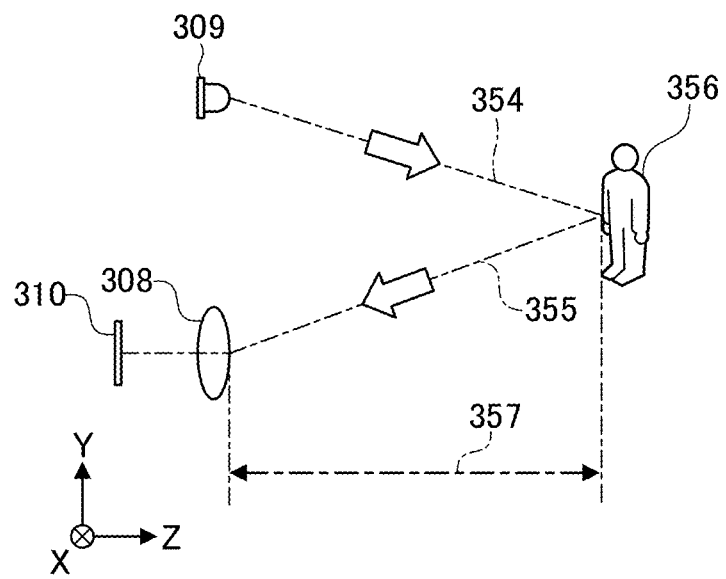
FIGS. 4A, 4B and 4C are diagrams for explaining a TOF system.

FIG. 4A is a diagram for explaining the TOF system. The light emitting element 309 generates the irradiation light 354 modulated at 10 MHz, for example, and irradiates the object 356 therewith in response to a control signal from the TOF-CPU 350. An image of the reflected light 355 from the object 356 is formed by the lens unit 308, and the light reaches the light receiving element 310 with a delay time in accordance with the distance to the object 356. The TOF-CPU 350 calculates the distance from the camera system 1 to the object 356 on the basis of the delay time (TOF scheme). In a case in which the delay time is 10 nanoseconds, for example, the object distance 357 is 3 m (=10 nano (0.00000001) seconds×300,000 km/second) since the speed of light is 300,000 km/second. In other words, the TOF-CPU 350 calculates (acquires) the distance information on the basis of a time until the light receiving unit 302 receives the reflected light after the light emitting unit 301 emits the irradiation light for irradiation.

Figure 4B:
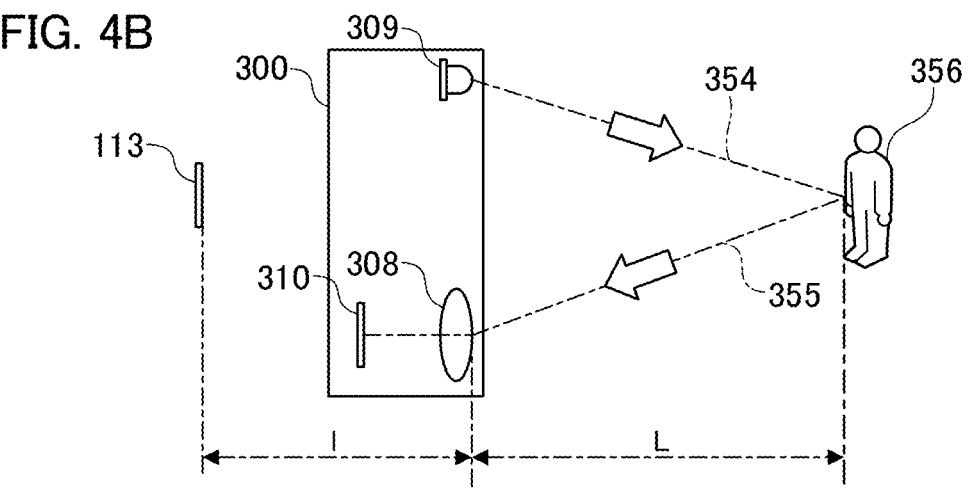

FIG. 4B is a drawing that shows the distance between the distance detection device 300 and the imaging element 113 of the camera 100. In FIG. 4B, the object distance 357 that has been acquired by the distance detection device 300 is set to distance information L. In this context, although the distance information L serves as the distance up to the lens unit 308, actually, this is the distance to the receiving element 310.

The distance detection device 300 is attached to the front end portion of the lens device 200, and thus, the imaging element 113 and the lens unit 308 of the camera 100 are attached at a distance separated only by 1 (small letter "1") units in the irradiation light axis direction. Thus, the lens device 200 stores the position information for the distance detection unit 300, and when the lens device 200 is attached to the camera 100, the MPU 101 acquires the distance information 1 (projection amount information). Therefore, based on the distance information L that has been acquired by the distance detection device 300, the MPU 101 records the distance 1 from the imaging element 113 to the lens unit 308 as a correction value, and the MPU 101 records this as the distance information L+1 for the distance to the object, where the distance information L+1 is the distance information L to which the distance 1, which is the correction value, has been added.

In the case in which the photographer replaces the lens device 200, the distance 1, which is the correction value, is changed by the position information for the lens device 200 after the replacement. The MPU 101 detects that the lens device 200 has been replaced, and records the distance 1, which is a correction value, in the memory as a correction value by acquiring the position information for the distance detection device 300.

In addition, in the case in which the total length of the lens device 200 changes due to a zoom operation or a focus action, the distance detection device 300 moves forward and backward accompanying the advancement to and retraction in the irradiation light axis direction O.

Figure 4C:
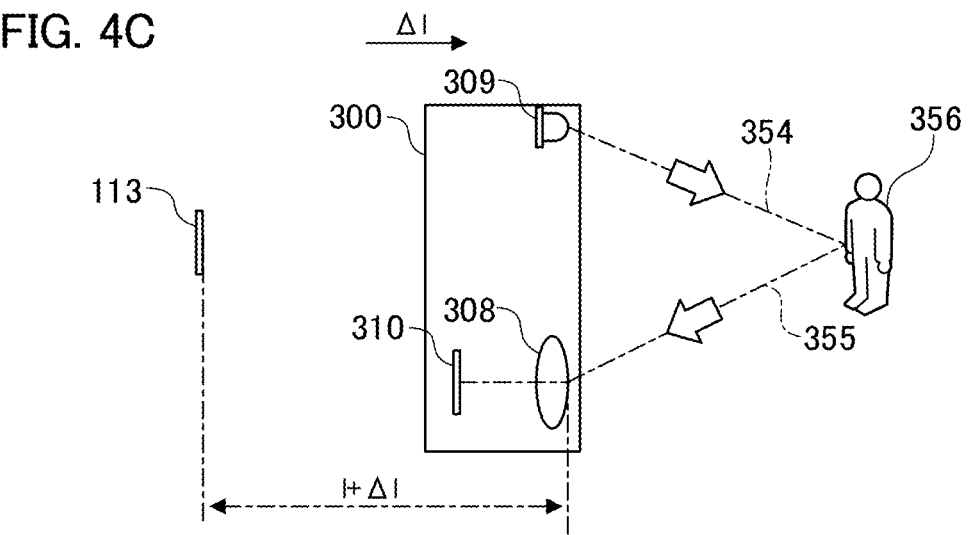

FIG. 4C is a figure in which the distance detection device 300 has moved to the object 356 side by only Δ1. At this time, the MPU 101 adds the movement amount Δ1 of the distance detection device 300 to the distance information 1, and records this as distance information 1+Δ1. Similarly, when moving so as to become distant from the object 356 by only a movement amount Δ1, this is recorded as distance information 1−Δ1. Therefore, the MPU 101 is linked to the zoom operation and the focus action, and continuously acquires the movement amount Δ1 (movable amount).

FIG. 5 is a diagram for explaining a captured image and a distance image acquired by the camera system 1.

Figure 5A:
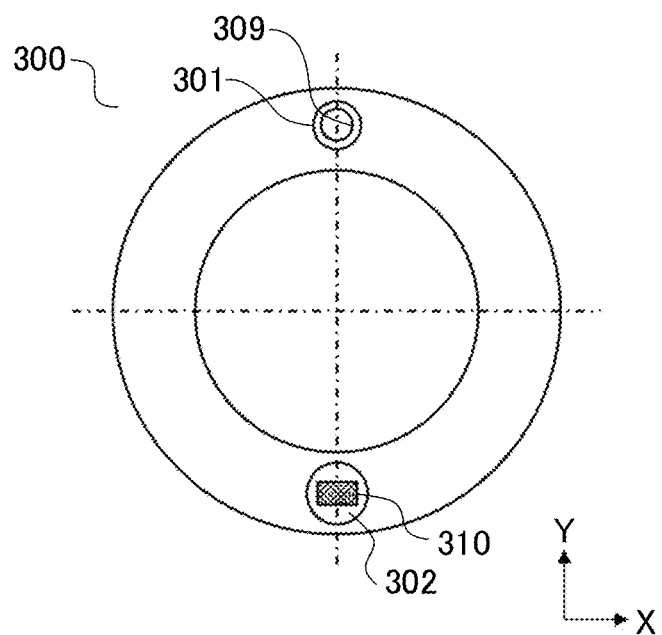
FIGS. 5A, 5B and 5C are diagrams for explaining a captured image and a distance image.

FIG. 5A illustrates a state of the distance detection device 300 when seen from the front side.

Figure 5B:
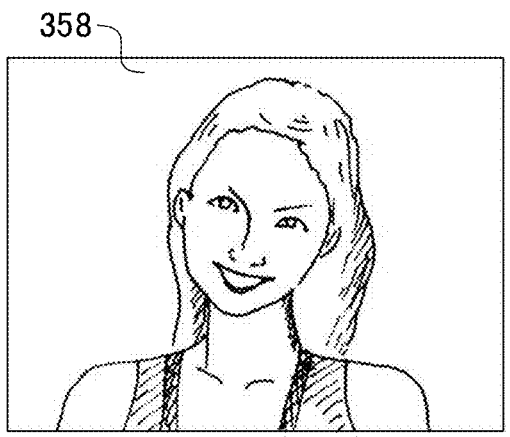
Figure 5C:
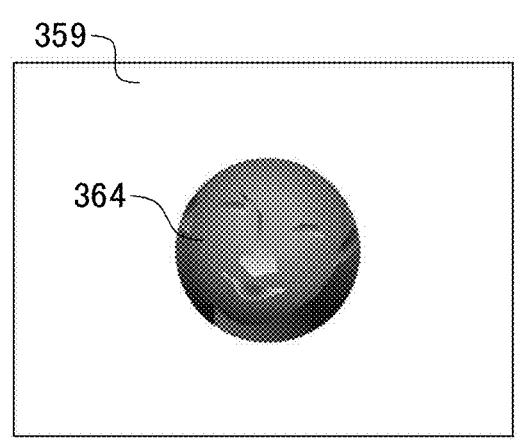

The distance detection device 300 includes the light emitting element 309 and the light receiving element 310 illustrated in FIG. 5A, for example. FIG. 5B illustrates an image 358 captured by the camera 100. FIG. 5C illustrates a distance image 359 captured by the distance detection device 300.

FIG. 5C represents an object distance acquired by the TOF system using concentration of white and black. The object distance is precisely acquired in the vicinity of the center of an image angle corresponding to a face part (feature region) of a person as an object. Precision of acquiring the object distance differs depending on the distance between the irradiation range of the light emitting element 309 and the object. Since the peripheral part in the vicinity of the center of the image angle is outside the irradiation range of the light emitting element 309, the precision of acquiring the object distance is poor. A map representing the object distance corresponding to the feature region of the object will be called an object distance map 364.

In the camera system 1, the distance detection device 300 is disposed at the distal end of the lens device 200. Therefore, the irradiation light 354 from the light emitting unit 301 is not blocked by the camera 100 and the lens device 200 (no vignetting occurs) in the process before reaching the object. Similarly, the reflected light 355 from the object 356 is not blocked by the camera 100 and the lens device 200 in the process before reaching the light receiving unit 302. Also, the camera system 1 can output a three-dimensional image with a spatial effect by synthesizing the captured image and the distance image obtained with precision. In a case in which the captured image 358 illustrated in FIG. 5B and the distance image 359 illustrated in FIG. 5C are synthesized, for example, it is possible to acquire an image of the face part of the person that can be acquired by the object distance map 364 expressed in three dimensions (an embossing degree or the like).

FIG. 6 is a diagram for explaining a method of adjusting a position of attachment of the distance detection device 300 to the camera 100.

When the distance detection device 300 is attached to the lens device 200, deviation in the rotation direction around the optical axis O at the center may occur between captured image angles of the image captured by the camera 100 and the distance image captured by the distance detection device 300. If the image captured by the camera 100 and the distance image captured by the distance detection device 300 are synthesized in this case, images with different capture image angles overlap one another, and it is thus difficult to acquire a three-dimensional image. Hereinafter, a method of adjusting the position for curbing or correcting deviations that may occur when the distance detection device 300 is attached will be described.

Figure 6A:
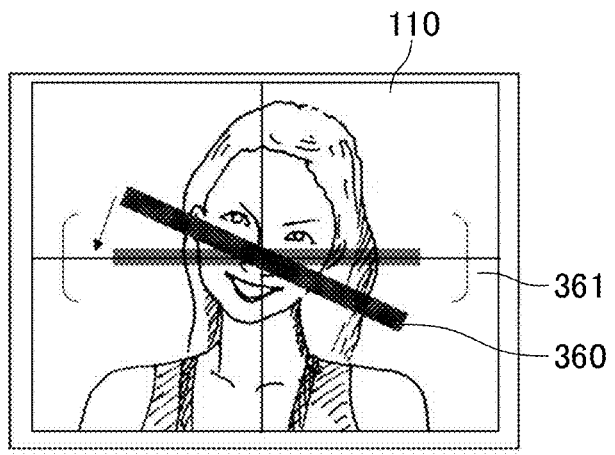
FIGS. 6A, 6B, 6C, and 6D are diagrams for explaining a method for adjusting an attachment position of the distance detection device.

First, a method of adjusting the position of attachment based on posture detection will be described with reference to FIG. 6A. FIG. 6A illustrates a state in which a live view image is displayed on the display unit 110 such as an LCD or a liquid crystal view finder (EVF) that the camera 100 has, which is not illustrated. As illustrated in FIG. 6A, the MPU 101 that the camera 100 has displays horizontal/vertical reference lines 361 on the display unit 110 in an overlapping manner on the live view image that is being displayed on the display unit 110. The horizontal/vertical reference lines 361 are, for example, grid lines or lines that perpendicularly intersect the optical axis O. Also, the MPU 101 acquires posture information of the distance detection device 300 detected by the posture detection unit 353 of the distance detection device 300 from the distance detection device 300 via the connection terminal 307 and the connection terminal 115. Also, the MPU 101 displays a bar 360 indicating the acquired posture information in an overlapping manner on the live view image. In this manner, a person who captures the image can easily recognize how much the distance detection device 300 deviates in the rotation direction around the optical axis O at the center. Also, the person who captures the image can adjust the position of the attachment of the distance detection device 300 to the camera 100 while viewing the reference lines 361 and the bar 360 displayed on the display unit 110.

Although the MPU 101 displays the posture of the distance detection device 300 using the bar 360 in the example illustrated in FIG. 6A, another display method can be applied as long as the person who captures the image can recognize the inclination of the distance detection device 300 with respect to the reference lines 361. Also, although it is only necessary for the posture detection unit 353 to be disposed inside the distance detection device 300, the posture detection unit 353 is preferably disposed at a position away from the optical axis O inside the distance detection device 300 for enhancing detection precision.

Figure 6B:
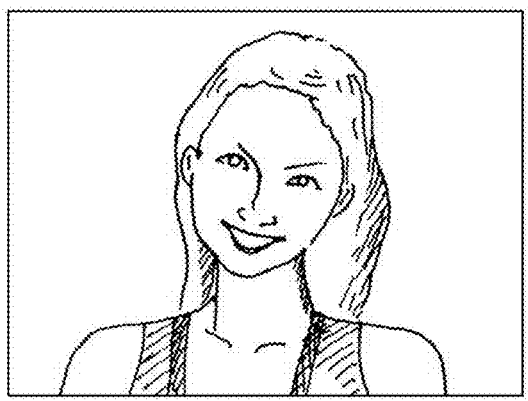
Figure 6C:
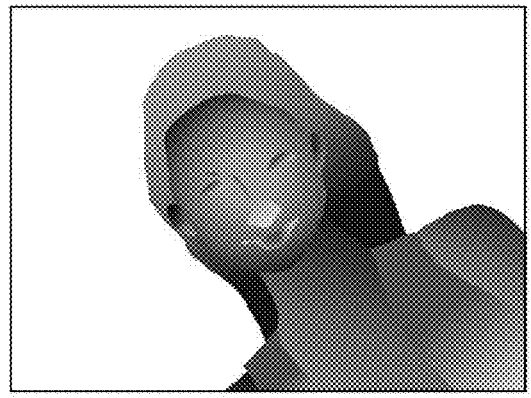
Figure 6D:
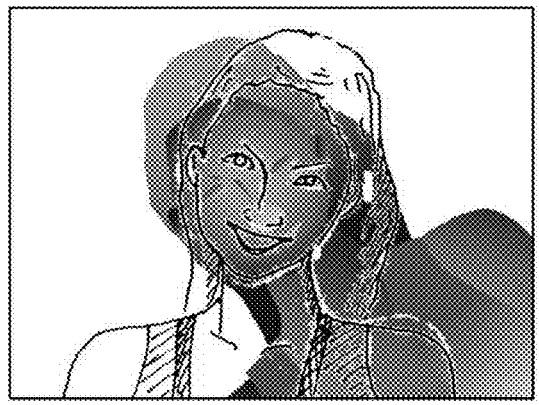

Next, a method of adjusting the position of the attachment based on image information will be described with reference to FIGS. 6B to 6D. FIG. 6B illustrates a live view image of a captured image that the camera 100 is capturing. FIG. 6C illustrates a live view image of a distance image that the distance detection device 300 attached to the camera 100 with deviation in the rotation direction around the optical axis O at the center by a predetermined amount is capturing. FIG. 6D illustrates a state in which the live view images are displayed on the display unit 110 of the camera 100.

As illustrated in FIG. 6D, the MPU 101 displays the live view image of the distance image illustrated in FIG. 6C in an overlapping manner on the live view image of the captured image illustrated in FIG. 6B on the display unit 110. In this manner, the person who captures the image can easily recognize how much the distance detection device 300 deviates in the rotation direction around the optical axis O at the center. Also, the person who captures the image can adjust the position of the attachment of the distance detection device 300 to the camera 100 while viewing the live view image of the captured image and the live view image of the distance image displayed on the display unit 110.

Next, a method for correcting deviation between images in the rotation direction around the optical axis O at the center through image processing in the camera 100 after image capturing will be described. The MPU 101 extracts an edge portion of the captured image illustrated in FIG. 6B and an edge portion of the distance image illustrated in FIG. 6C. The edge portion of the captured image is, for example, a location where a color or a contrast of the object suddenly changes. The edge portion of the distance image is, for example, a location where distance information suddenly changes. The MPU 101 performs the correction such that the edge portions conform to each other by rotationally moving the distance image and displays the distance image in an overlapping manner with the captured image. When the captured image and the distance image are synthesized, the MPU 101 finishes the synthesized image as a three-dimensional image through cutting (trimming) since the distance image illustrated in FIG. 6C is inclined with respect to the captured image.

Next, a method for attaching and securing the distance detection device 300 to the distal end of the lens device 200 using the attachment mechanisms 303 will be described with reference to FIGS. 12 to 16.

Figure 12:
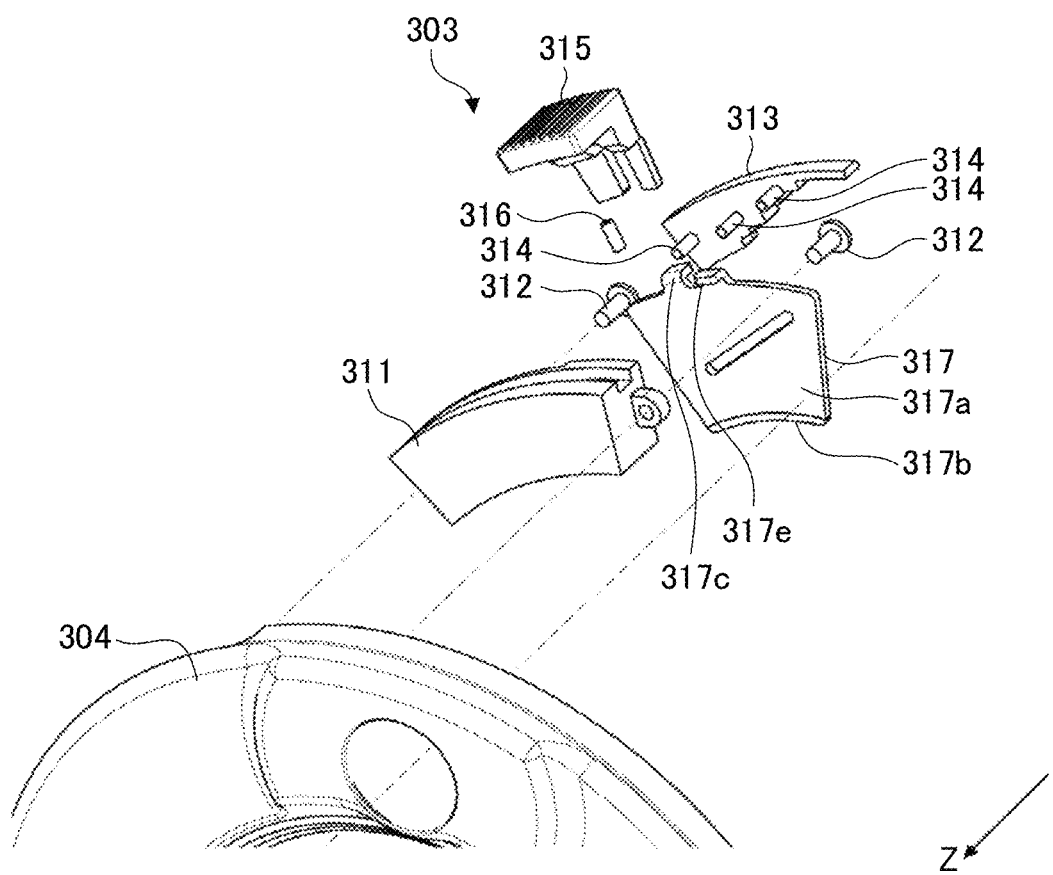
FIG. 12 is an example of an exploded perspective view of an attachment mechanism.

FIG. 12 is an example of an exploded perspective view of the attachment mechanism 303.

An attachment base 311 of the attachment mechanism 303 is screwed and secured to the front cover 304 using a screw 312. The attachment base 311 may be formed integrally with the front cover 304 or may be attached to the rear cover 305.

A slider 313 that is a slide member is incorporated in the attachment base 311. The slider 313 is biased in a −Z direction with a spring 314 such that the slider 313 can operate in a direction parallel to the optical axis O relative to the attachment base 311 and performs a sliding operation relative to a rib of the attachment base 311, which is not illustrated. Also, a plurality of step difference shaped portions (a first locking wall 313a to a fifth locking wall 313f) are formed in the slider 313.

The operation lever 315 is disposed at a position at which the slider 313 is sandwiched between the attachment base 311 and the operation lever 315. The operation lever 315 is biased in the radiation direction from the optical axis O, that is, outward in the radial direction of the distance detection device 300 with a spring 316 incorporated at a location of the attachment base 311, which is not illustrated. The operation lever 315 can perform an operation in the aforementioned radiation direction with the spring 316. Also, the operation lever 315 is pinched between the front cover 304 and the rear cover 305 and can operate in the circumferential direction of an outer shape of the distance detection device 300.

A slide blade 317 is disposed between the slider 313 and the operation lever 315 and is sandwiched between the attachment base 311 and a rib of the rear cover 305, which is not illustrated. Operations of the slide blade 317 will be described later. The slide blade 317 is formed into a thin plate shape and has a metal portion 317a. Also, the slide blade 317 has, for example, a rubber portion 317b as an end formed of a flexible member.

FIG. 13 is a diagram illustrating a state before the distance detection device 300 is attached to the lens device 200.

Figure 13A:
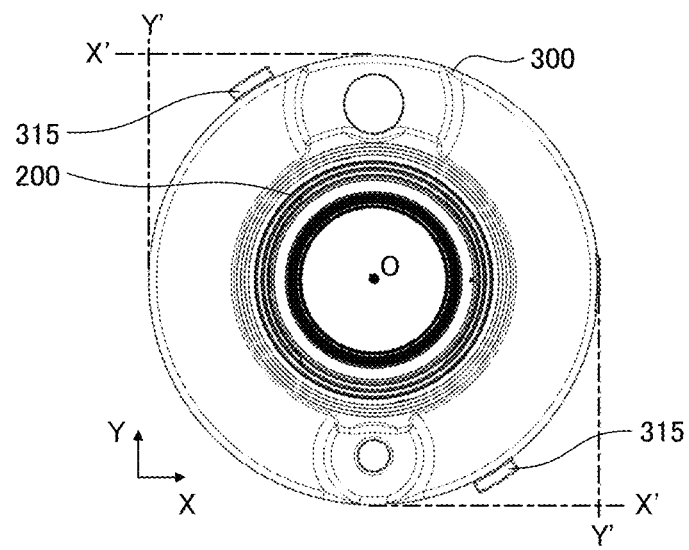
FIGS. 13A, 13B and 13C are diagrams illustrating a state before the distance detection device is attached to a lens device.

FIG. 13A illustrates a state when the distance detection device 300 is seen from the side of the optical axis O.

In a state before the distance detection device 300 is attached to the lens device 200, that is, when the operation lever 315 is not operated, the operation lever 315 is disposed at a position extending further outward in the radial direction of the distance detection device 300 than the outer peripheral surface of the distance detection device 300. The distance detection device 300 illustrated in FIG. 13A is provided with a plurality of operation levers 315. Therefore, the distance detection device 300 has a plurality of attachment mechanisms 303 disposed at positions at which they face each other with the optical axis O sandwiched therebetween.

Figure 13B:
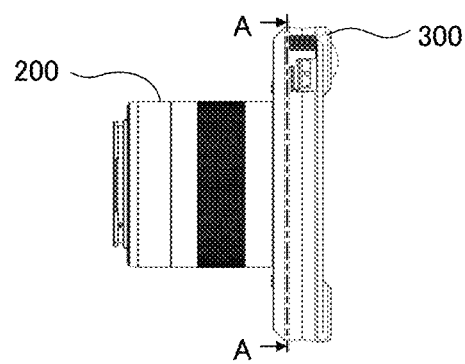

FIG. 13B is a side view corresponding to FIG. 13A. Also, FIG. 13C illustrates a section along the A-A line in FIG. 13B.

Figure 13C:
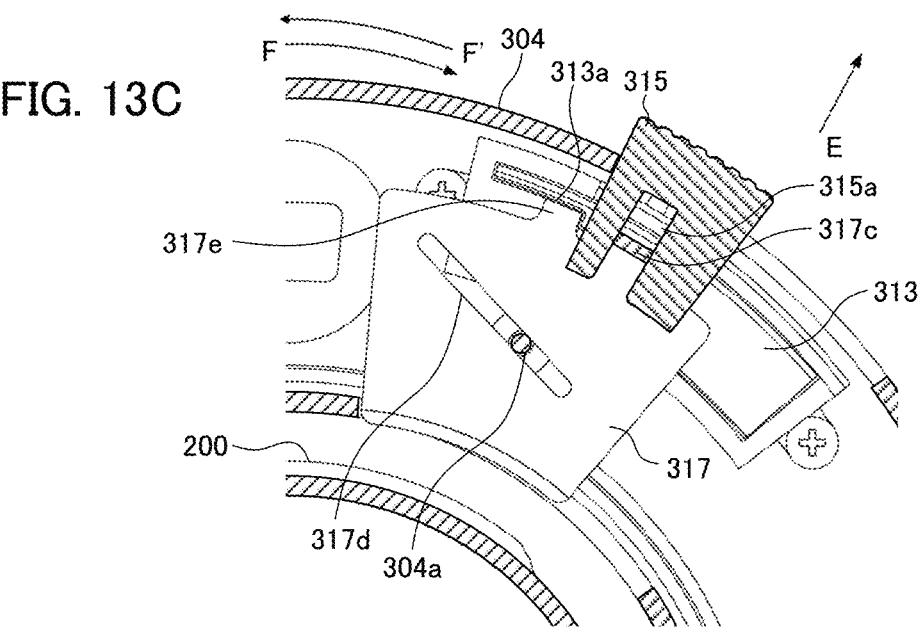

In the state illustrated in FIG. 13C, the slide blade 317 is not in contact with the lens device 200. The operation levers 315 are biased with the spring 316 and are located at positions sticking out in a radiation direction E with reference to the optical axis O. At this time, there is a relationship in which notch portions 315a of the shafts of the operation levers 315 and a standing curved portion 317c of the slide blade 317 are fitted to each other. Also, there is a relationship in which a cam hole 317d of the slide blade 317 slides with a sliding dowel 304a of the front cover 304.

In the state illustrated in FIG. 13C, a locking portion 317e of the slide blade 317 that serves as a locked member and a first locking wall 313a of the slider 313 are in an abutting or approaching state. Thus, the locking portion 317e of the slide blade 317 is brought into contact and locked with the first locking wall 313a of the slider 313 even if the operation lever 315 is operated in a circumferential direction F (the clockwise direction in FIG. 13C) of the distance detection device 300. In this manner, the rotation of the operation lever 315 is restricted, and the operation lever 315 cannot move in the peripheral direction around the optical axis O at the center.

On the other hand, if it is attempted to operate the operation lever 315 in a circumferential direction F' (the counterclockwise direction in FIG. 13C) of the distance detection device 300, the front cover 304 and the operation lever 315 are brought into contact with each other, and rotation of the operation lever 315 is restricted.

FIGS. 14 to 16 illustrate a state of the distance detection device 300 when the operation lever 315 is operated.

Figure 14A:
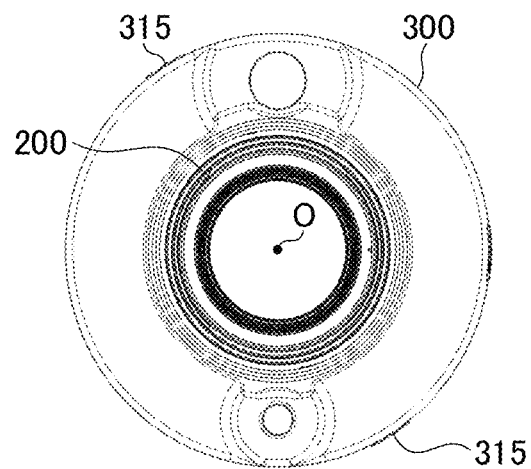
FIGS. 14A and 14B are diagrams illustrating a state of the distance detection device when an operation lever is operated.

When the operation lever 315 is operated, the locked state of the slide blade 317 is released. FIG. 14A illustrates a state of the distance detection device 300 when the person who captures the image presses the operation lever 315 in a direction opposite to the radiation direction E. When the operation lever 315 is pressed, the operation lever 315 operates to enter the inside of the distance detection device 300.

Figure 14B:
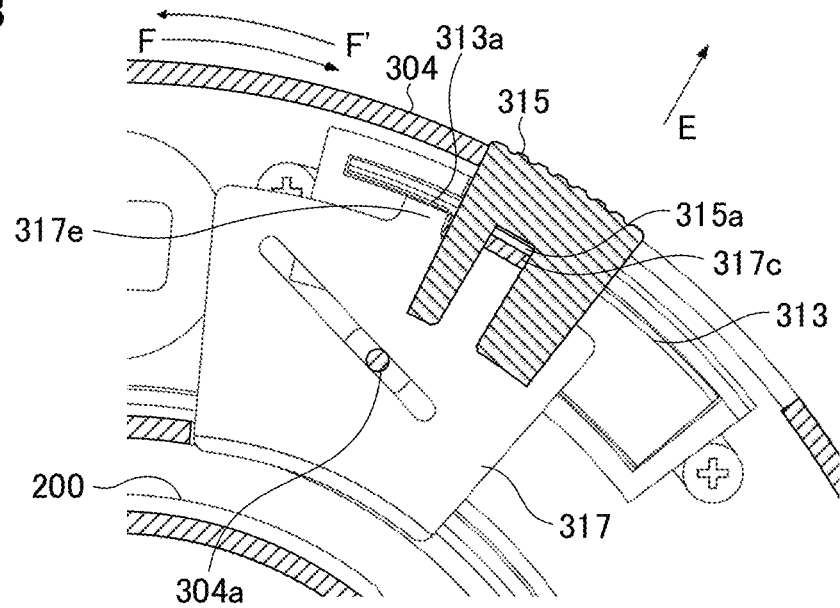
Figure 15A:
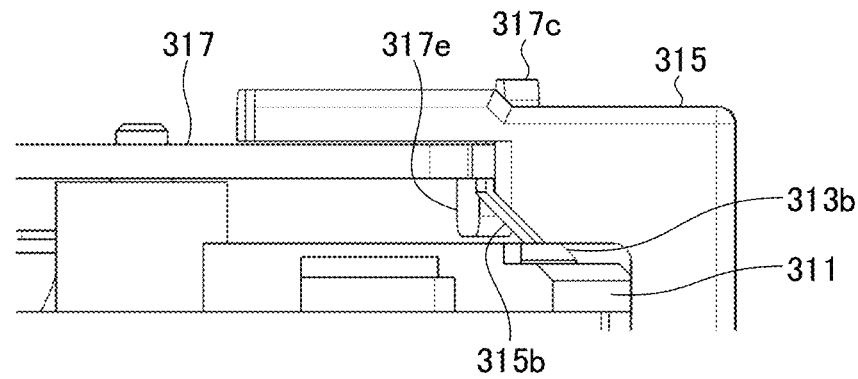
FIGS. 15A and 15B are diagrams illustrating a state of the distance detection device when the operation lever is operated.
Figure 15B:
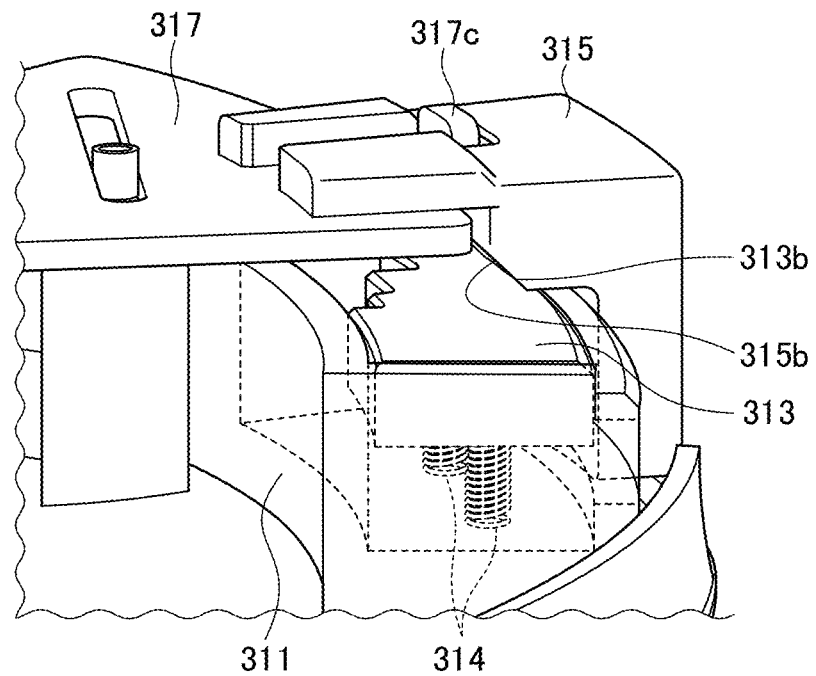

FIG. 14B illustrates a section in the state in FIG. 14A. If the person who captures the image presses the operation lever 315 in a direction against a bias force of the spring 316 (−E direction), the notch portion 315a operates along the standing curved portion 317c of the slide blade 317. At this time, an oblique surface portion 315b of the operation lever 315 is brought into contact with an oblique surface portion 313b of the slider 313, and the slider 313 moves in the Z direction as illustrated in FIGS. 15A and 15B. In the state in which the operation lever 315 is pressed, the slider 313 is pushed in the Z direction, and the first locking wall 313a of the slider 313 is thus separated from the locking portion 317e of the slide blade 317. In this manner, the locking of the slide spring 317 is released, the restriction of the rotation of the operation lever 315 is released, and the operation lever 315 is brought into a state in which the operation lever 315 can move in the peripheral direction around the optical axis O at the center.

FIG. 16 illustrates a state of the distance detection device 300 when the person who captures the image performs an operation of rotating the operation lever 315 in the circumferential direction F while pressing the operation lever 315.

Figure 16A:
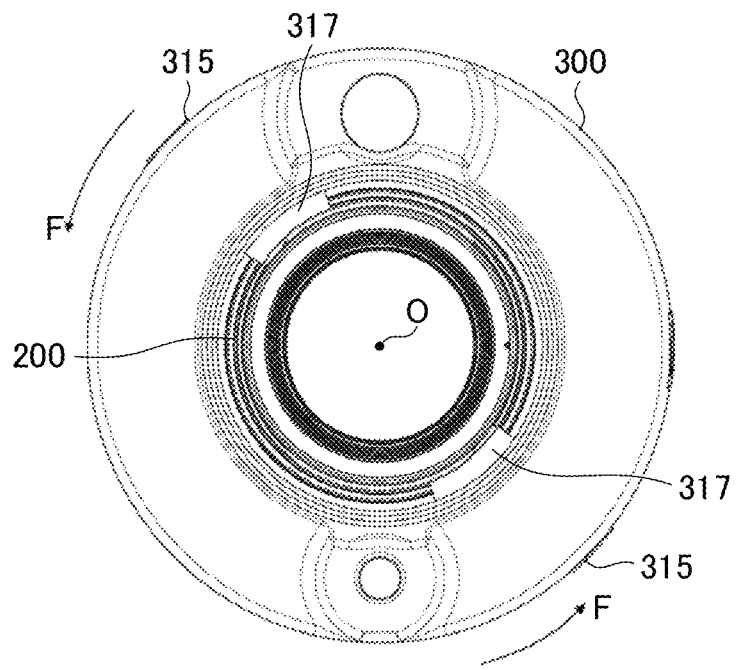
FIGS. 16A and 16B are diagrams illustrating a state of the distance detection device when the operation lever is operated.
Figure 16B:
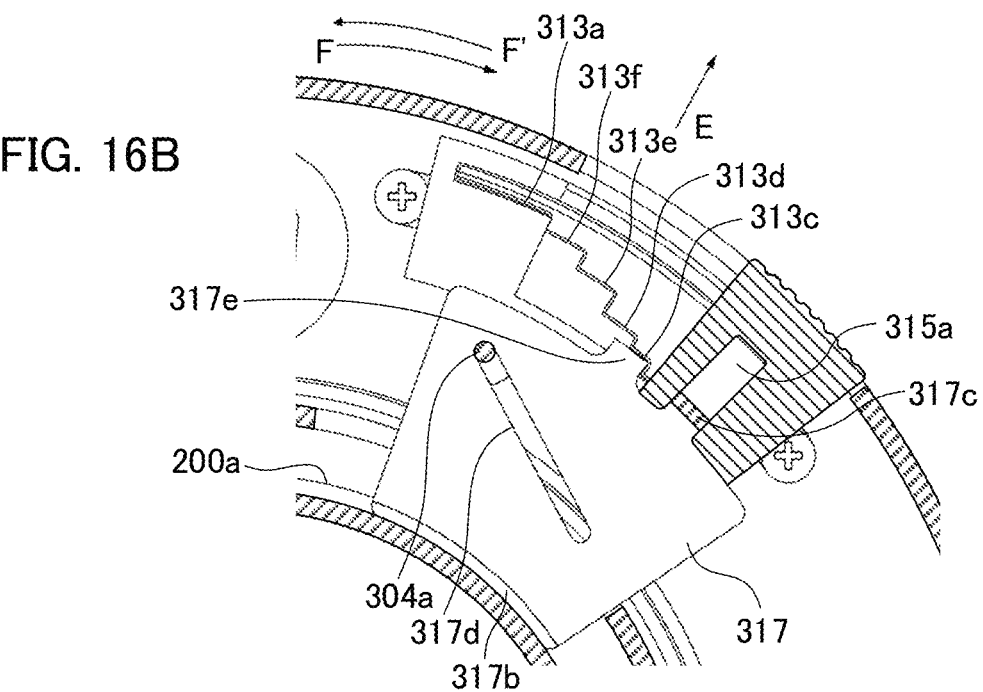

As illustrated in FIG. 16A, if the person who captures the image performs the operation of rotating the operation lever 315 in the circumferential direction F, the slide blade 317 operates on the inner peripheral side of the distance detection device 300, that is, the direction toward the lens device 200. FIG. 16B illustrates a section of the attachment mechanism 303 after the operation of rotating the operation lever 315. If the slide blade 317 moves to the position illustrated in FIG. 16B, the lens device 200 is pinched with the rubber portion 317b of the slide blade 317. In this manner, it is possible to retain the distance detection device 300 secured to the lens device 200.

If the person who captures the image performs the operation of rotating the operation lever 315 in the circumferential direction F in a pressed state in the −E direction, the notch portion 315a of the operation lever 315 and the standing curved portion 317c of the slide blade 317 operate in a conjunctive manner. If the slide blade 317 moves in the circumferential direction F, the sliding dowel 304a of the front cover 304 and the cam hole 317d slide, and the slide blade 317 moves toward the lens device 200 (in the −E direction).

In the state illustrated in FIG. 16B, the rubber portion 317b of the slide blade 317 is pressed against a groove portion 200a of the lens device 200. As illustrated in FIG. 16A, the attachment mechanisms 303 are disposed at two locations at which they face each other with the optical axis O sandwiched therebetween, and the distance detection device 300 pinches the lens device 200 and is secured by the rubber portion 317b being pressed against the groove portion 200a of the lens device 200.

FIG. 17 is a diagram illustrating a state of the distance detection device 300 when the person who captures the image releases the operation lever 315 from the state in FIG. 16A, that is, when the operation lever is not pressed (non-operation time).

Figure 17A:
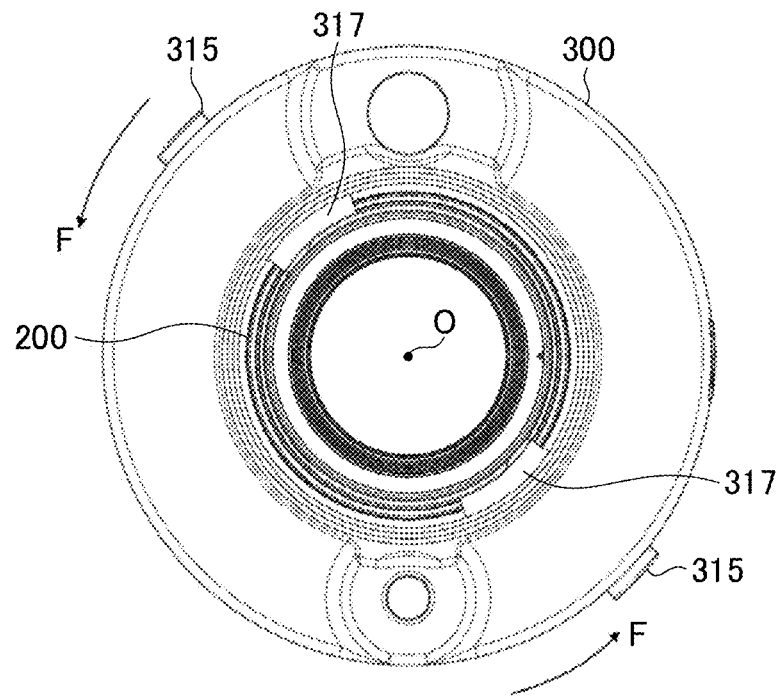
FIGS. 17A and 17B are diagrams illustrating a state of the distance detection device when the operation lever is not operated.
Figure 17B:
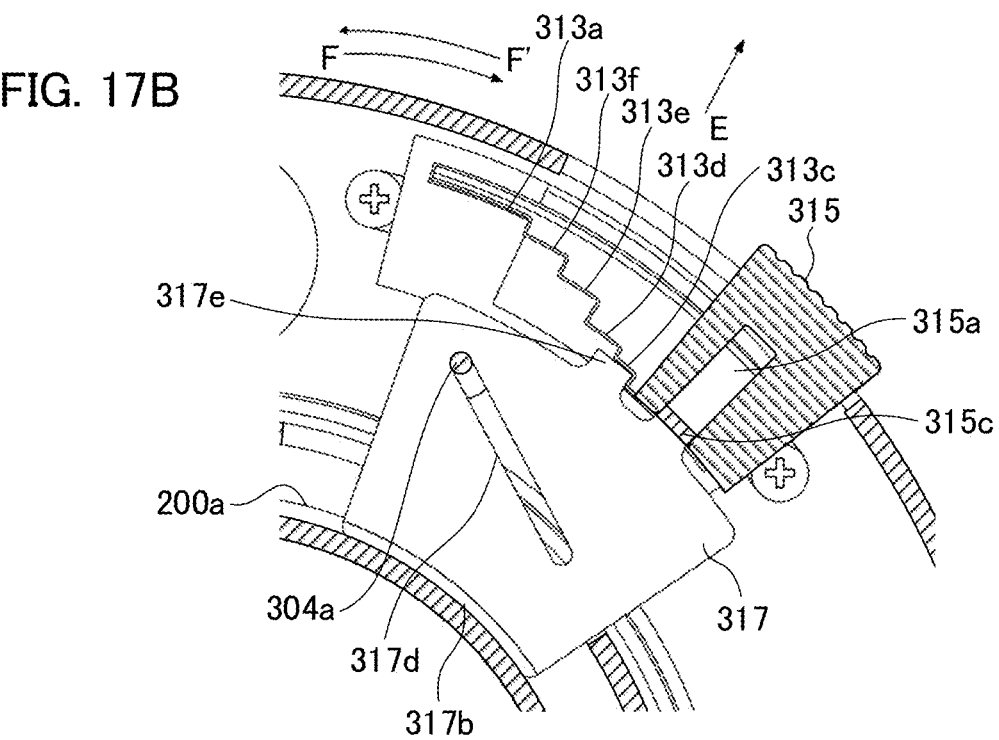

If the person who captures the image releases his/her hand from the state in which the operation lever 315 is pressed, the operation lever 315 is brought into a state in which the operation lever 315 is sticking out in the E direction from the outer peripheral surface of the distance detection device 300 as illustrated in FIGS. 17A and 17B. On the other hand, the slide blade 317 holds the state illustrated in FIG. 16, and the distance detection device 300 is thus secured to the lens device 200.

FIG. 17B illustrates a section of the attachment mechanism 303 in the state in FIG. 17A.

The operation lever 315 is pushed to the side of the outer shape of the distance detection device 300 due to a bias force of the spring 316 while the notch portion 315a and the slide blade 317 slide.

If the operation lever 315 moves to the position in FIG. 17B, the state in which the slider is biased in the Z direction by the operation lever 315 is released. Therefore, the locking portion 317e of the slide blade 317 and the second locking wall 313c of the slider 313 are disposed in an abutting or approaching state. Thus, the slide blade 317 is locked, and the state in which the distance detection device 300 pinches the lens device 200 and is retained in a secured manner can be maintained.

Even if it is attempted to rotate the operation lever 315 in the circumferential direction F, the state in which the distance detection device 300 retains the lens device 200 in a secured manner is maintained due to engagement between the sliding dowel 304a and the cam hole 317d and abutting between the locking portion 317e and the second locking wall 313c. Also, since the slide blade 317 is fitted into the groove portion 200a of the lens device 200, the distance detection device 300 does not unexpectedly move.

With the configuration as described above, the distance detection device 300 is retained by the lens device 200 in a secured manner. In a case in which the outer diameter of the lens device 200 differs from that in the aforementioned example, the state in which the distance detection device 300 pinches the lens device 200 can be maintained with a third locking wall 313d, a fourth locking wall 313e, or a fifth locking wall 313f instead of the second locking wall 313c. The second locking wall 313c to the fifth locking wall 313f are formed as walls at different angles. In other words, the planes formed by the second locking wall 313c to the fifth locking wall 313f have angles in accordance with the position of the slide blade 317. Note that the angle of the plane that forms the first locking wall 313a may be set to be different from the angles of the planes forming the other locking walls.

As illustrated in FIG. 13, the operation lever 315 is disposed at the position sticking outward in the radial direction from the outer periphery of the distance detection device 300 for the following reason. In a case in which the operation lever 315 is disposed on the front surface side (the side of the front cover 304) of the distance detection device 300, a hand or the like of the person who captures the image may be blocked by the lens device 200 when the person who captures the image operates the operation lever 315. On the other hand, in a case in which the operation lever 315 is disposed on the rear surface side (the side of the rear cover 305) of the distance detection device 300, the person who captures the image may unexpectedly touch the operation lever 315 when the person who captures the image operates the lens device 200. Therefore, the operation lever 315 is suitably disposed at the position sticking outward in the radial direction of the distance detection device 300.

As illustrated in FIG. 13A, the operation lever 315 is disposed in a region surrounded by an outer diameter arc of the distance detection device 300, a first tangent line at a first point, and a second tangent line at a second point on the outer periphery of the distance detection device 300. The first tangent line and the second tangent line perpendicularly intersect one another. Also, the aforementioned outer diameter arc is an outer diameter arc from the first point to the second point. For example, the first tangent line is a tangent line X' in the X direction while the second tangent line is a tangent line Y' in the Y direction. Thus, even in a case in which the distance detection device 300 is placed on a desk or the like in a state in which the distance detection device 300 is secured to the lens device 200, the operation lever 315 is not brought into a direct contact with the desk, and the locking of the attachment mechanisms 303 is not unexpectedly released.

FIG. 18 is a diagram illustrating a configuration example of the distance detection device 300 adapted in consideration of heat generation of the light emitting unit 301 and the light receiving unit 302.

There is a concern that the light emitting element 309 and the light receiving element (TOF sensor) 310 disposed in the distance detection device 300 may serve as heat generation sources and these may affect detection precision and operations of the distance detection device 300. Hereinafter, the light emitting unit 301 including the light emitting element 309 and the light receiving unit 302 including the light receiving element (TOF sensor) 310 will be defined as heat generation sources.

Figure 18A:
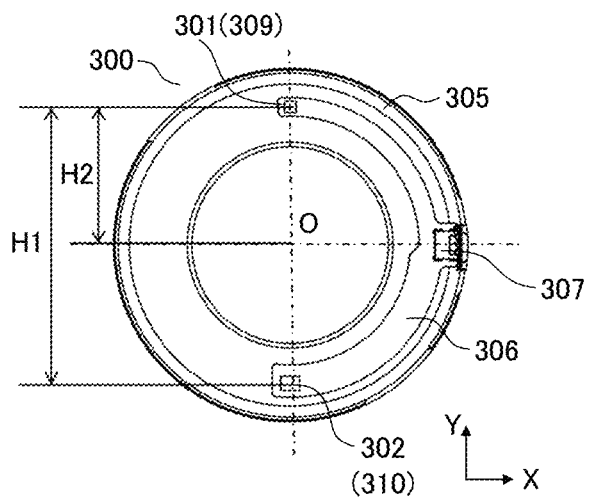
FIGS. 18A, 18B, and 18C are diagrams illustrating a configuration example of the distance detection device.

FIG. 18A illustrates a state of the distance detection device 300 from which the front cover 304 has been removed when seen from the front side. As illustrated in FIG. 18A, the FPC 306 that is a circuit board in the distance detection device 300 includes the light emitting unit 301, the light receiving unit 302, and the connection terminal 307. Also, although the FPC 306 is disposed along the side of the rear cover 305, the FPC 306 may be disposed on the side of the front cover 304. In the example illustrated in FIG. 18, the light emitting element 309 in the light emitting unit 301, the light receiving element (TOF sensor) 310 in the light receiving unit 302, and the connection terminal 307 are mounted on the FPC 306.

In the example illustrated in FIG. 18A, the light emitting unit 301 and the light receiving unit 302 are disposed on the Y axis with the optical axis O at the center. The distance from the light emitting unit 301 to the light receiving unit 302 is defined as a distance H1. Also, the distance from the optical axis O, that is, the central axis of the distance detection device to the light emitting unit 301 is defined as a distance H2. The light emitting unit 301 and the light receiving unit 302 are disposed such that the distance H1 is longer than the distance H2. Since the light emitting unit 301 and the light receiving unit 302 that are heat generation sources are located at a far distance in the configuration illustrated in FIG. 18A, it is possible to curb a local temperature rise in the distance detection device 300.

The light emitting unit 301 and the light receiving unit 302 may not be disposed on the Y axis with the optical axis O at the center. Even in a case in which the light emitting unit 301 and the light receiving unit 302 cannot be disposed on the Y axis, it is only necessary to set the distance H1 from the light emitting unit 301 to the light receiving unit 302 to be longer than the distance H2 from the optical axis O to the light emitting unit 301. It is possible to set the distance H1 to be longer than the distance H2 in the distance detection device 300 by disposing the light emitting unit 301 and the light receiving unit 302 at positions at which they face one another with the optical axis O sandwiched therebetween in a plane that perpendicularly intersects the optical axis O.

The connection terminal 307 is disposed at an intermediate position between the light emitting unit 301 and the light receiving unit 302 disposed on the FPC 306. Therefore, the FPC 306 is branched into two parts toward the light emitting unit 301 and the light receiving unit 302 when seen from the connection terminal 307. With this configuration, it is possible to curb a temperature rise due to heat transmitted from the light emitting unit 301 and the light receiving unit 302 in relation to the connection terminal 307 exposed to the exterior of the distance detection device 300. Note that the position of the connection terminal 307 is not limited to the intermediate position between the light emitting unit 301 and the light receiving unit 302 on the FPC 306.

Figure 18B:
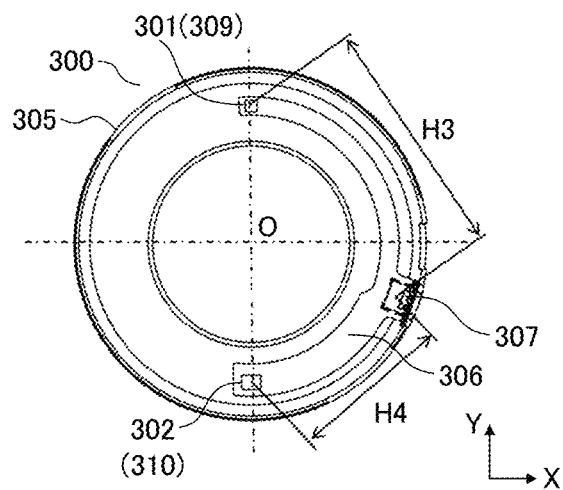

FIG. 18B illustrates an example of disposition of the connection terminal 307 in the distance detection device 300.

The distance from the light emitting unit 301 to the connection terminal 307 is defined as a distance H3. The distance from the light receiving unit 302 to the connection terminal 307 is defined as a distance H4. The connection terminal 307 is disposed such that the distance H3 is longer than the distance H4. Therefore, the connection terminal 307 illustrated in FIG. 18B is disposed closer to the side of the light receiving unit 302 as compared with the connection terminal 307 illustrated in FIG. 18A. With such a configuration, it is possible to curb a temperature rise at the connection terminal 307 even if the light emitting unit 301 includes the light emitting element 309 with high heat generating properties with respect to the light receiving unit 302. On the other hand, in a case in which the light receiving unit 302 includes the light receiving element (TOF sensor) 310 that has high heat generating properties with respect to the light emitting unit 301, the connection terminal 307 is disposed on the side of the light emitting unit 301.

As illustrated in FIG. 1 described above, the camera 100 and the distance detection device 300 are electrically connected with the cable 2. Therefore, the connection terminal 307 of the distance detection device 300 is preferably connected to the connection terminal 115 of the camera 100 at a shortest distance with the cable 2. Thus, the connection terminal 307 of the distance detection device 300 is disposed in the same direction as that of the connection terminal 115 of the camera 100 with reference to the optical axis O in a plane that perpendicularly intersects the optical axis O.

Figure 18C:
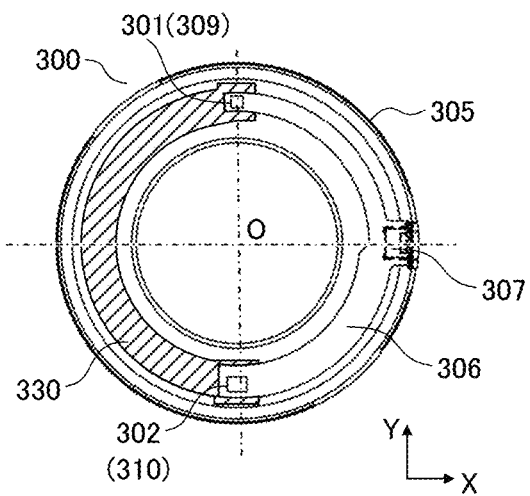

FIG. 18C illustrates an example in which a heat countermeasure member 330 is disposed in the distance detection device 300. As the heat countermeasure member 330, a heat dissipating member such as a metal plate made of metal such as copper or aluminum or a graphite sheet is used.

The heat countermeasure member 330 is disposed at a position at which it faces the FPC 306 (a facing position with reference to the Y axis) with the optical axis O, that is, the central axis of the distance detection device 300, sandwiched therebetween. The attachment position of the heat countermeasure member 330 is not limited to the position illustrated in FIG. 18C. The heat countermeasure member 330 may be disposed in substantially the same plane as that of the FPC 306. With such a configuration, it is possible to dispose the heat countermeasure member 330 without increasing the thickness of the distance detection device 300 in the Z-axis direction. In the configuration example illustrated in FIG. 18C, the heat countermeasure member 330 is disposed at the position that faces the disposition position of the connection terminal 307 with the optical axis O sandwiched therebetween, and it is thus possible to curb a temperature rise in the connection terminal 307 as compared with the configuration example illustrated in FIG. 18B. Note that although the FPC 306 and the heat countermeasure member 330 have substantially equivalent lengths in FIG. 18C, it is not necessary for the FPC 306 and the heat countermeasure member 330 to have equivalent lengths. Also, the distance detection device 300 may have a plurality of heat countermeasure members 330. Although the heat countermeasure member 330 in FIG. 18C is disposed so as to connect the light emitting unit 301 to the light receiving unit 302, the heat countermeasure members 330 may be disposed in each of the light emitting unit 301 and the light receiving unit 302.

Figure 19:
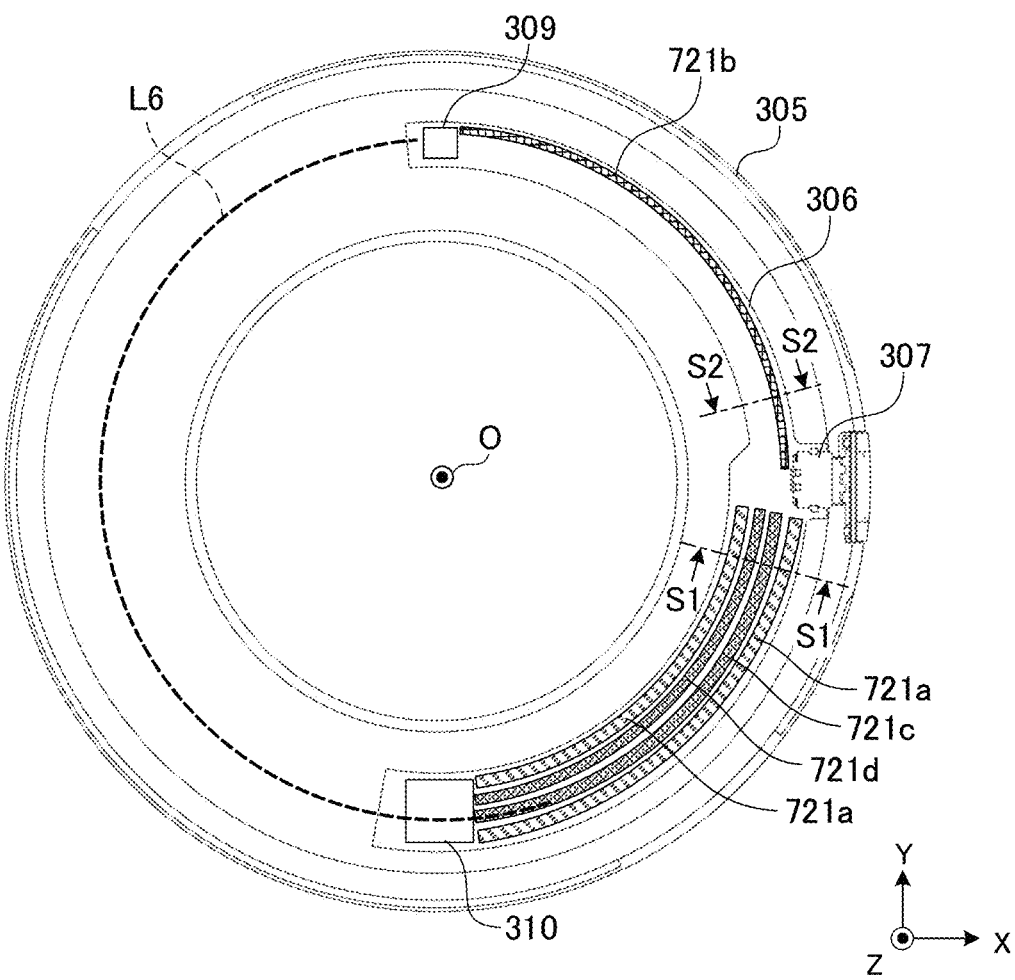
FIG. 19 is a diagram for explaining an example of a signal wiring provided on an FPC.
Figure 19:
Figure 19:
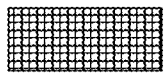
Figure 19:
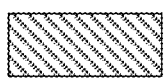

FIGS. 19 and 20 are diagrams for explaining an example of a signal wiring provided on the FPC 306.

Figure 20A:
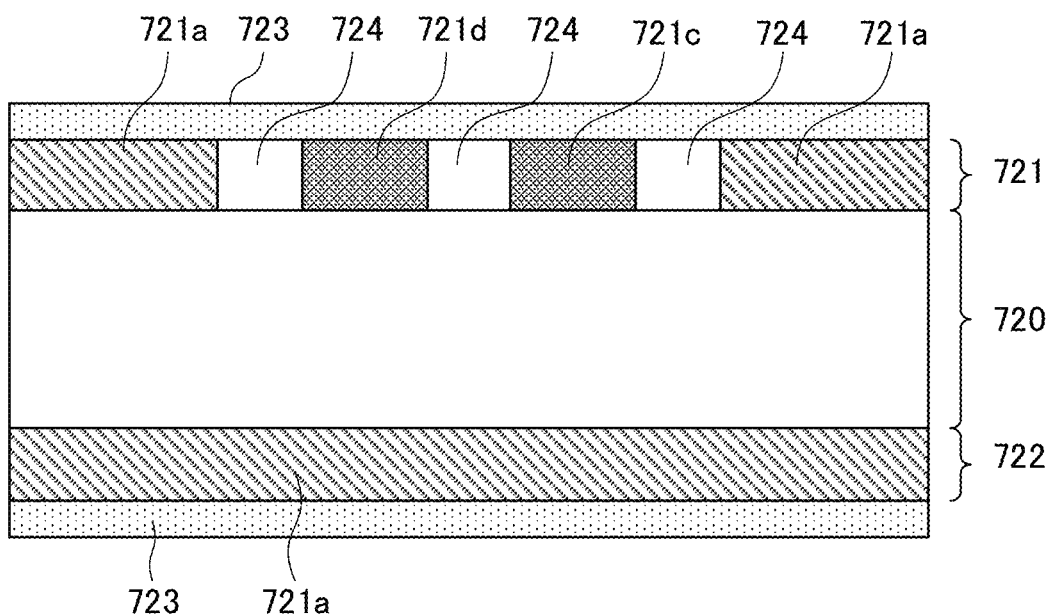
FIGS. 20A and 20B are diagrams for explaining an example of the signal wiring provided on the FPC.
Figure 20B:
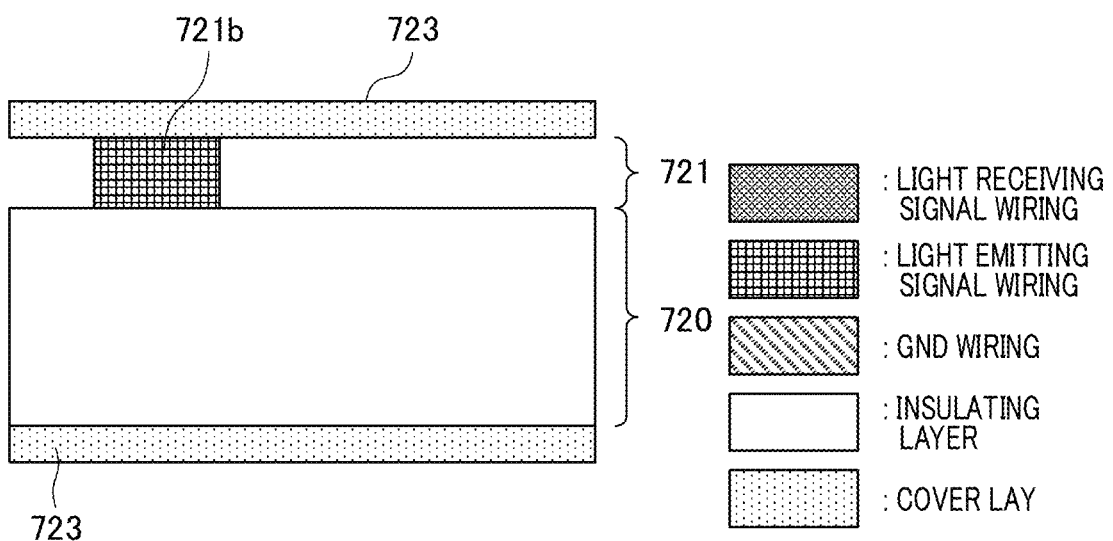

FIG. 19 illustrates a plan view of the signal wiring provided on the FPC 306. FIG. 20 illustrates a sectional view of the FPC 306. FIG. 20A illustrates a section along the S1-S1 line in FIG. 19 while FIG. 20B illustrates a sectional along the S2-S2 line in FIG. 19.

The configuration of the FPC 306 and the wiring position for each signal provided on the FPC 306 will be described. As illustrated in FIG. 19, a light emitting signal wiring 721b that is a first signal wiring electrically connects the light emitting element 309 to the connection terminal 307. An analog signal for driving the light emitting element 309 from the light source drive unit 351 (FIG. 3) is transmitted to the light emitting element 309 via the light emitting signal wiring 721b. The analog signal for driving the light emitting element 309 includes a modulation signal for modulating the irradiation light 354 from the light emitting element 309 at high frequency, for example.

Also, light receiving signal wirings 721c and 721d that are second signal wirings electrically connect the light receiving element 310 to the connection terminal 307. An analog signal output from the light receiving element 310 is converted into a digital signal by the A/D converter 352 (illustrated in FIG. 3) and is transmitted to the connection terminal 307 via the light receiving signal wirings 721c and 721d. The digital signal is transmitted as a distance image to the MPU 101 via the cable 2 and the connection terminal 115.

As illustrated in FIG. 20A, the FPC 306 includes an insulating layer 720, a first wiring layer 721 laminated and formed on one surface of the insulating layer 720, and a second wiring layer 722 laminated and formed on the other surface of the insulating layer 720. As illustrated in FIG. 20A, a GND wiring 721a and a pair of light receiving signal wirings 721c and 721d are arranged in the first wiring layer 721. Also, the GND wiring 721a is arranged in the second wiring layer 722 as well. In addition, the light emitting signal wiring 721b is also arranged in the first wiring layer 721 as illustrated in FIG. 20B. The first wiring layer 721 and the second wiring layer 722 are covered with a cover lay 723 that is an insulating member to protect the GND wiring 721a, the light emitting signal wiring 721b, the light receiving signal wirings 721c and 721d.

Next, a method for arranging the light receiving signal wirings 721c and 721d will be described. The light receiving signal wirings 721c and 721d are surrounded by the GND wiring 721a from their sides in the first wiring layer 721 and are also surrounded from their lower sides by the GND wiring 721a provided in the second wiring layer 722 via the insulating layer 720. Also, the light receiving signal wirings 721c and 721d are arranged in parallel, and gaps 724 are provided between the GND wiring 721a and the light receiving signal wirings 721c and 721d and between the light receiving signal wiring 721c and the light receiving signal wiring 721d. With the configuration described above, the light receiving signal wirings 721c and 721d form differential signal wirings. In this manner, a signal waveform interference (crosstalk) due to coupling of electromagnetic fields between the light receiving signal wirings 721c and 721d that are high-speed transmission signal wirings and the adjacent signal wirings is curbed.

Next, a method of arranging the light emitting signal wiring 721b will be described.

As illustrated in FIG. 19, the light emitting signal wiring 721b is arranged in a clockwise direction when seen from the front side of the distance detection device 300 (when seen from the −Z direction) from the light emitting element 309 toward the connection terminal 307.

A case in which the light emitting signal wiring 721b is arranged on a wiring route of the line segment L6 (the route in the counterclockwise direction) illustrated in FIG. 19 is assumed. In this case, the light emitting signal wiring 721b passes through a position that faces the light receiving element 310 or the light receiving signal wirings 721c and 721d in the lamination direction of the FPC 306 with the insulating layer 720 sandwiched therebetween. At this position, crosstalk occurs between the light receiving signal wirings 721c and 721d and the light emitting element signal wiring 724, and this leads to a degradation of precision of the amount of irradiation light emitted from the light emitting element 309 for irradiation or leads to a generation of noise in an analog signal output from the light receiving element 310. As a result, precision of a distance image acquired by the distance detection device 300 is degraded.

In order to prevent the crosstalk, a method of arranging the light emitting signal wiring 721b away from the light receiving signal wirings 721c and 721d in the lamination direction and the surface direction of the FPC 306 is conceivable. However, the FPC 306 is enlarged in the lamination direction and the surface direction by the amount of separation in the arrangement of the light emitting signal wiring 721b, and the distance detection device 300 increases in size.

In this embodiment, by providing the light emitting signal wiring 721b in the clockwise direction as illustrated in FIG. 19, it is possible to arrange the light emitting signal wiring 721b without causing the light emitting signal wiring 721b to overlap the light receiving signal wirings 721c and 721d in the lamination direction of the FPC 306 and without causing the light emitting signal wiring 721b to be adjacent to the light receiving signal wirings 721c and 721d in the surface direction. The aforementioned configuration can prevent crosstalk from occurring between the light receiving signal wirings 721c and 721d and a light emitting element signal wirings 724 and acquire a distance image with precision.

Since the distance detection device 300 according to the embodiment described above is attached to the end of the lens device 200 on the object side, it is possible to acquire distance image information without allowing the irradiation light from the light emitting unit 301 to be blocked by the lens device 200. Although the example in which the distance detection device 300 has an annular shape has been described in the embodiment, the distance detection device 300 may have a configuration other than the annular shape as long as the distance detection device 300 is disposed near the distal end of the lens device 200.

Second Embodiment

Figure 7:
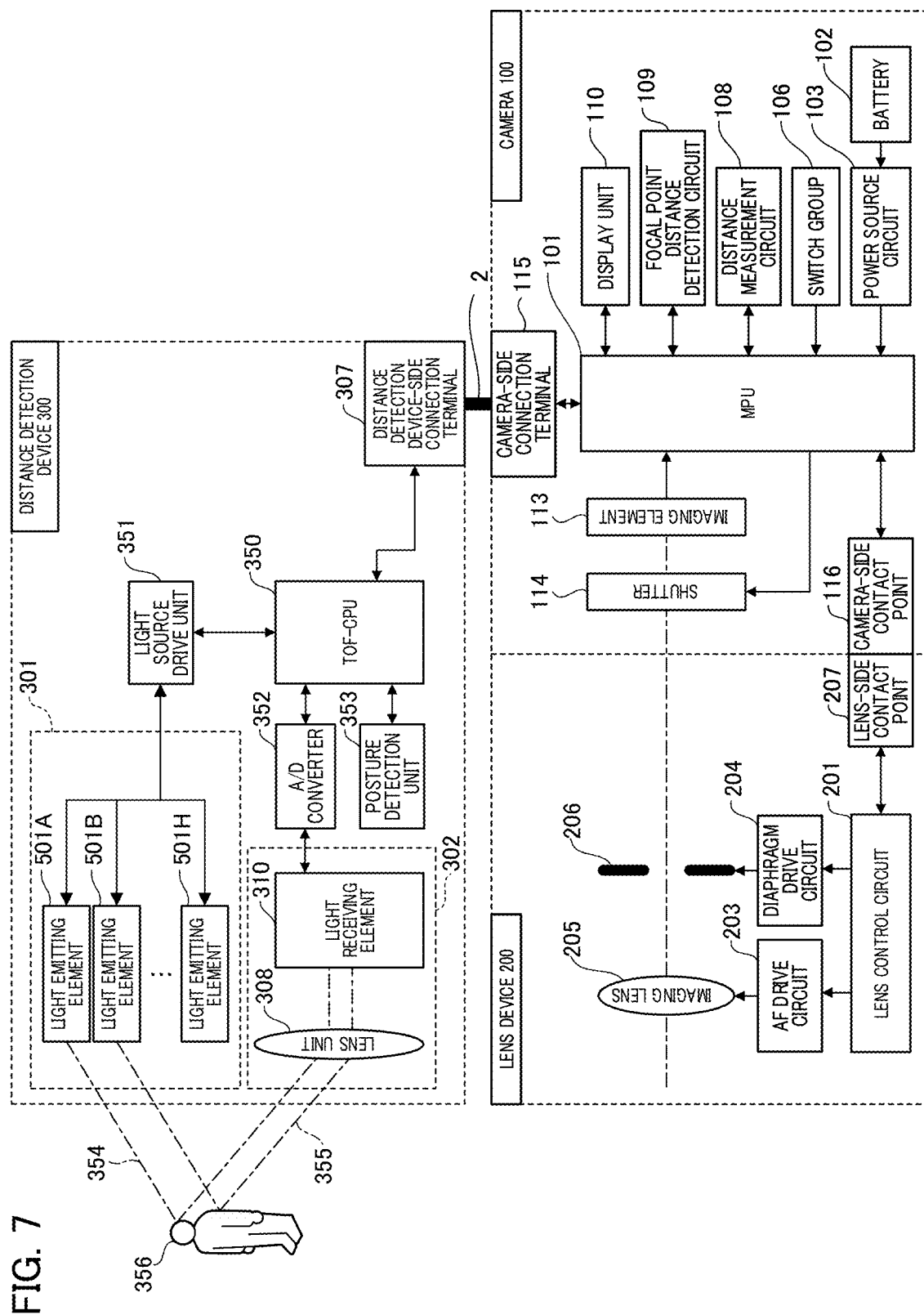
FIG. 7 is a diagram for explaining a circuit configuration of the camera system.

Referring to FIGS. 7 and 8, a second embodiment will be described.

FIG. 7 is a block diagram illustrating a main electrical configuration of a camera system 1.

The same reference signs will be applied to the same components as those in the camera system 1 described in the first embodiment, and detailed description thereof will be omitted. As illustrated in FIG. 7, a light emitting unit 301 is provided with a plurality of light emitting elements 501A to 501H. In the light emitting unit 301, a light source drive unit 351 drives the plurality of light emitting elements and causes each of the light emitting elements to irradiate an object with irradiation light 354 in response to a signal controlled by a TOF-CPU 350. By disposing the plurality of light emitting elements in the light emitting unit 301 in this manner, it is possible to increase the irradiation range of the irradiation light 354 with respect to a captured image angle of a camera 100. Thus, it is also possible to irradiate the entire region of the captured image angle with the irradiation light 354 by taking the irradiation range of the light emitting elements and the number of disposed light emitting elements into consideration.

If each light emitting unit 301 irradiates the object with the irradiation light 354 from the light emitting elements at the same time, there may be a case in which precision of detection of distance information is degraded in a case in which the irradiation light 354 overlaps. Thus, each light emitting unit 301 may emit light at different timings instead of emitting light at the same time.

FIG. 8 is a diagram for explaining disposition of the plurality of light emitting elements and the irradiation range of the irradiation light from the light emitting elements in the second embodiment.

Although an example in which the distance detection device 300 includes eight light emitting elements mounted thereon is illustrated in FIG. 8, the number of light emitting elements may be any number. FIG. 8A illustrates a state when the distance detection device 300 in which the light emitting elements are disposed so as to emit irradiation light for irradiation in parallel to an optical axis O is seen from the front side. FIG. 8B illustrates an irradiation range of the irradiation light from the light emitting elements with respect to a captured image angle 500 of the camera 100 in the case of the disposition example illustrated in FIG. 8A.

Figure 8A:
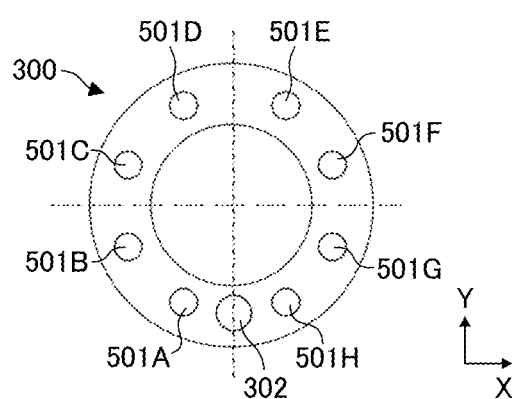
FIGS. 8A, 8B, 8C, 8D, 8E, and 8F are diagrams for explaining disposition of a light emitting element and an irradiation range of irradiation light from the light emitting element.
Figure 8D:
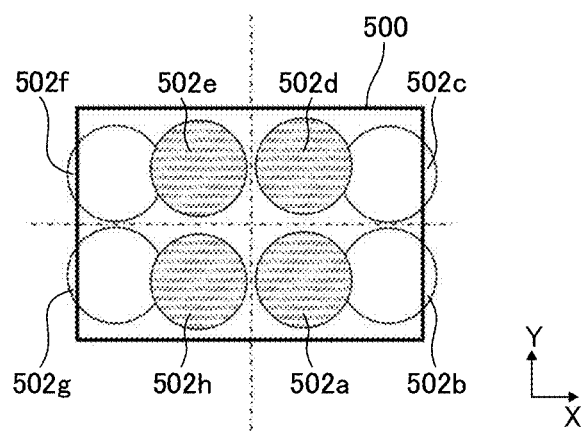
Figure 8B:
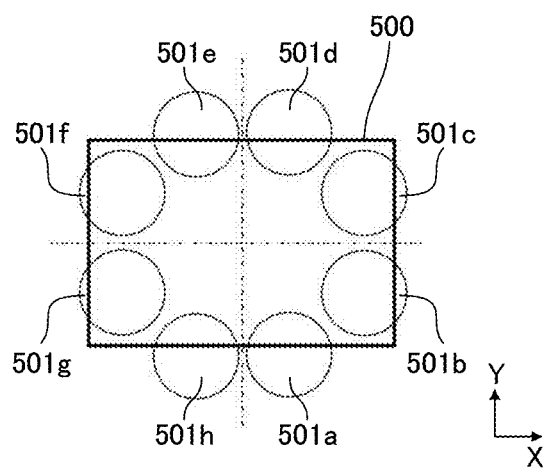

In FIG. 8A, the light emitting elements 501A, 501B, 501C, 501D, 501E, 501F, 501G, and 501H are disposed at equal distances from the optical axis O and at equal intervals among the light emitting elements. In FIG. 8B, irradiation ranges 501a to 501h correspond to the irradiation ranges of the light emitting elements 501A to 501H in FIG. 8A, respectively. By disposing the plurality of light emitting elements in the distance detection device 300, it is possible to increase the irradiation ranges of the irradiation light with respect to the captured image angle 500 of the camera 100. Thus, it is possible to expand a range in which it is possible to acquire an object distance using the aforementioned TOF system.

However, since the captured image angle 500 is typically short in the Y-axis direction due to a difference in aspect ratio of the imaging element 113 as illustrated in FIG. 8B. Therefore, the irradiation ranges 501a, 501d, 501e, and 501h of the light emitting elements 501A, 501D, 501E, and 501H disposed away from the optical axis O in the Y direction are likely to stick out from the captured image angle 500.

Hereinafter, preferred disposition of the plurality of light emitting elements will be described. In the preferred disposition example, the irradiation light axis of at least one of the light emitting elements is not parallel to the optical axis O. FIG. 8C illustrates a state when the distance detection device 300 in which the light emitting elements are disposed so as to perform irradiation with an inclination at a predetermined angle with respect to the direction of the optical axis O is seen from a side. FIG. 8D illustrates irradiation ranges of the irradiation from the light emitting elements with respect to the captured image angle 500 of the camera 100 in the case of the disposition example illustrated in FIG. 8C.

In the example illustrated in FIG. 8C, the light emitting elements in FIG. 8A are disposed with inclination at a predetermined angle with respect to the direction of the optical axis O. The light emitting element 502C and the light emitting element 502D will be described as an example. An angle between an irradiation light axis C of irradiation light from the light emitting element 502C with respect to the object and the optical axis O is defined as an angle θ1. Also, an angle between an irradiation light axis D of irradiation light from the light emitting element 502D with respect to the object and the optical axis O is defined as an angle θ2. The irradiation light axis C and the irradiation light axis D are not parallel to the optical axis O. The light emitting elements 502C and 502D are disposed such that the angle θ2 is greater than the angle θ1. The first light emitting unit (light emitting element 502D), the distance of which from the central axis (optical axis O) of the distance detection device 300 in the vertical direction is a first distance, has greater inclination of the irradiation light axis than the second light emitting unit (light emitting element 502C), the distance of which from the central axis in the vertical direction is a second distance that is shorter than the first distance. In this manner, it is possible to cause the irradiation range 502d to be located on the center side of the captured image angle 500 as illustrated in FIG. 8D.

Also, in FIG. 8B, the irradiation range 501c of the irradiation light from the light emitting element 501C less deviates in the Y-axis direction with respect to the captured image angle 500 than the irradiation range 501d. Therefore, the light emitting element 502C performs irradiation at the angle θ1 that is smaller than the angle θ2 corresponding to the irradiation light from the light emitting element 502D as illustrated in FIG. 8C. In other words, it is necessary to dispose the light emitting elements by setting the light emitting elements further from the optical axis O in the vertical direction (Y-axis direction) to have greater angles between the irradiation directions with respect to the object and the optical axis O. However, the ranges of the object distance in which image capturing can be performed are narrower as the angles between the irradiation directions with respect to the object and the optical axis O increase. Thus, a more preferred disposition example illustrated in FIGS. 8E and 8F may be applied.

Figure 8E:
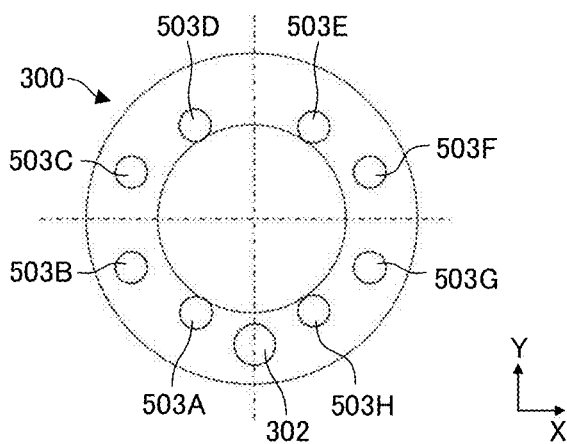
Figure 8C:
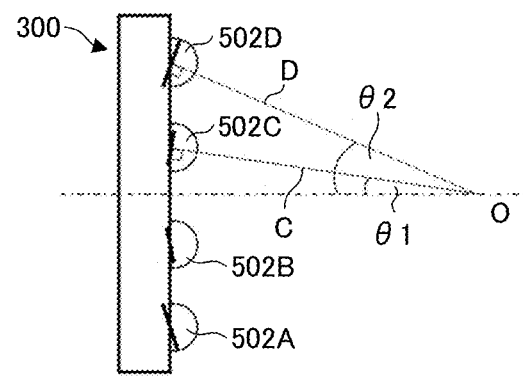
Figure 8F:
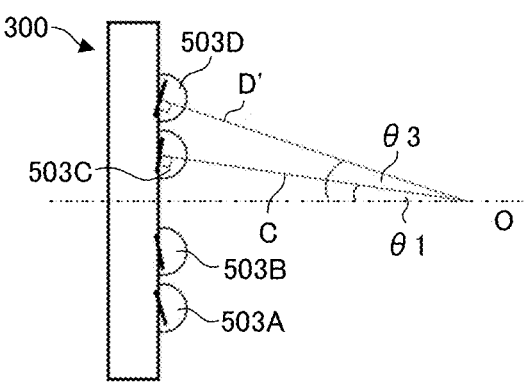

FIG. 8E illustrates a state when the distance detection device 300 in which a part of the plurality of light emitting elements is disposed to be closer to the optical axis O is seen from the front side. FIG. 8F illustrates a disposition example corresponding to FIG. 8E and illustrates a state in which the distance detection device 300 when the light emitting elements are disposed so as to perform irradiation with inclination at a predetermined angle with respect to the optical axis O is seen from a side. The positions of the light emitting elements 503B, 503C, 503F, and 503G are similar to the positions of the light emitting elements 501B, 501C, 501F, and 501G in FIG. 8A. The light emitting elements 503A, 503D, 503E, and 503H illustrated in FIG. 8E are disposed inward (inner circumferential side) in the radial direction of the distance detection device 300 so as to be closer to the optical axis O as compared with the light emitting elements 501A, 501D, 501E, and 501H illustrated in FIG. 8A.

As illustrated in FIG. 8F, the angle between the irradiation light axis D' of the irradiation light from the light emitting element 503D with respect to the object and the optical axis O is defined as an angle θ3. By employing the disposition of the light emitting elements as illustrated in FIG. 8E, the angle θ3 illustrated in FIG. 8F becomes an angle that is smaller than the angle θ2 between the irradiation light axis D of the irradiation light from the light emitting element 502D with respect to the object as illustrated in FIG. 8C and the optical axis O. In other words, it is possible to minimize the inclination of the irradiation light with respect to the direction of the optical axis O by disposing the light emitting elements located further in the Y-axis direction from the optical axis O, such as the light emitting elements 503A, 503D, 503E, and 503H, inward in the radial direction of the distance detection device 300 such that the light emitting elements approach the optical axis O.

Next, an order of irradiation with irradiation light from the light emitting elements will be described. As an example, a case where an object, a distance image of which is desired to be obtained, is present near the center of the captured image angle 500 will be described. In the camera system 1, the light emitting elements 503A, 503D, 503E, and 503H configured to irradiate the vicinity of the center of the captured image angle 500 emit irradiation light for irradiation first, and then the light emitting elements 503B, 503C, 503F, and 503G emit irradiation light for irradiation. Since the object near the center of the captured image angle 500 can be irradiated first by emitting the irradiation light from the light emitting elements in such an order, the person who captures the image fails to captures the object in fewer cases. Although the disposition of the light emitting elements with respect to the captured image angle 500 in relation to the Y-axis direction has been described, the same applies to the X-axis direction.

Third Embodiment

Figure 9:
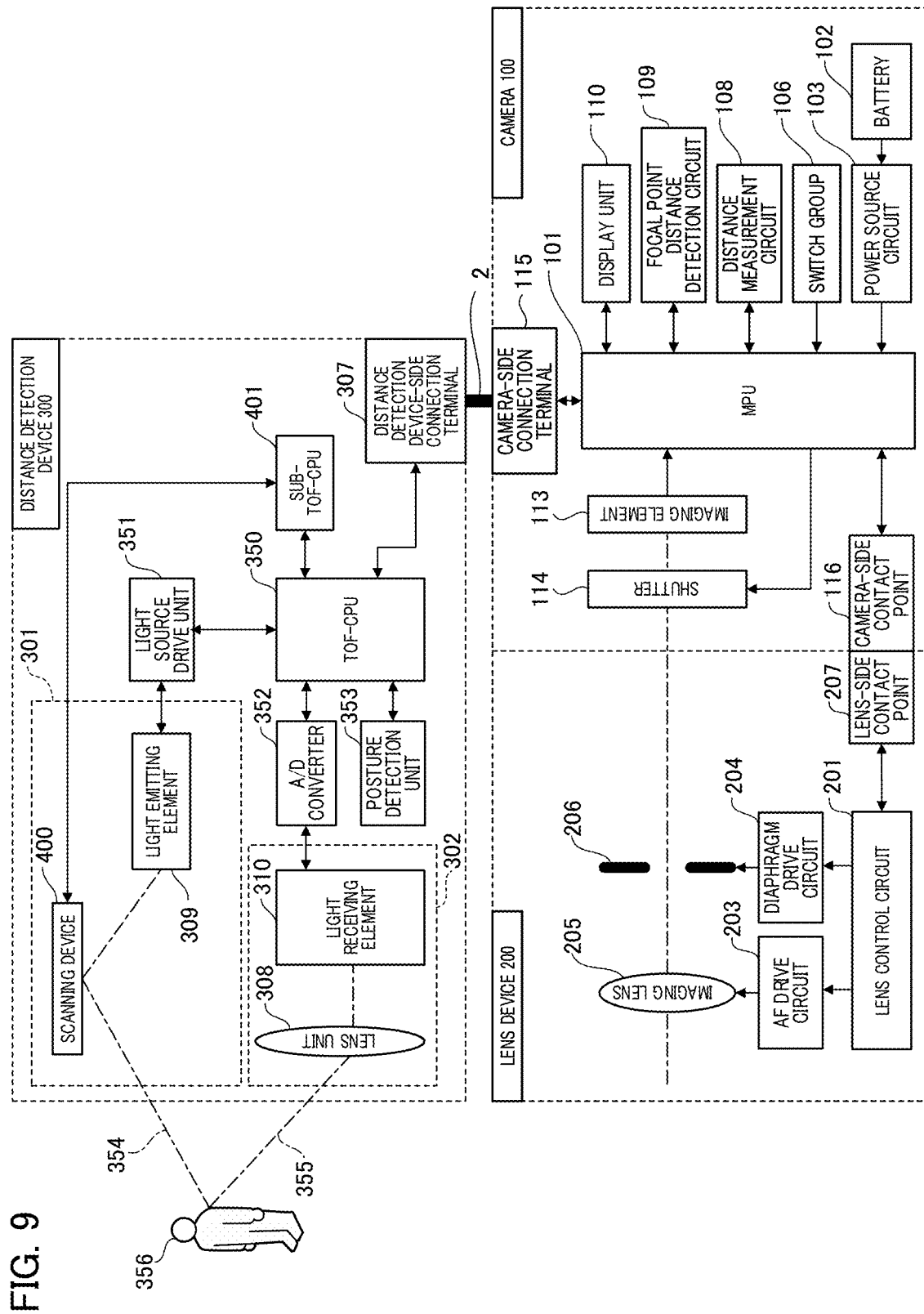
FIG. 9 is a diagram for explaining a circuit configuration of the camera system.

FIG. 9 is a block diagram illustrating a main electrical configuration of a camera system 1 according to a third embodiment.

The same reference signs will be applied to the same components as those in the camera system 1 described in the first embodiment, and detailed description thereof will be omitted. In the third embodiment, the distance detection device 300 has a light emitting unit 301 that has a light emitting element and a scanning device of a MEMS scheme produced using a semiconductor process. The MEMS is an abbreviation of a micro-electro-mechanical system.

As illustrated in FIG. 9, the light emitting unit 301 is provided with a scanning device 400 of the MEMS scheme along with a light emitting element 309. Also, the distance detection device 300 has a SUB-TOF-CPU 401 that serves as a control unit configured to cause a scanning device 400 to operate. The SUB-TOF-CPU 401 receives a control signal from a TOF-CPU 350 and drives the scanning device 400.

A light source driving unit 351 causes the light emitting element 309 to emit light by the control signal from the TOF-CPU 350, and the emitted light is reflected by a reflection mirror 402 of the scanning device 400 to irradiate the object. With the configuration illustrated in FIG. 9, it is possible to expand the irradiation range as compared with the first embodiment. Also, the TOF-CPU 350 may directly control the scanning device 400 without providing the SUB-TOF-CPU 401.

Figure 10:
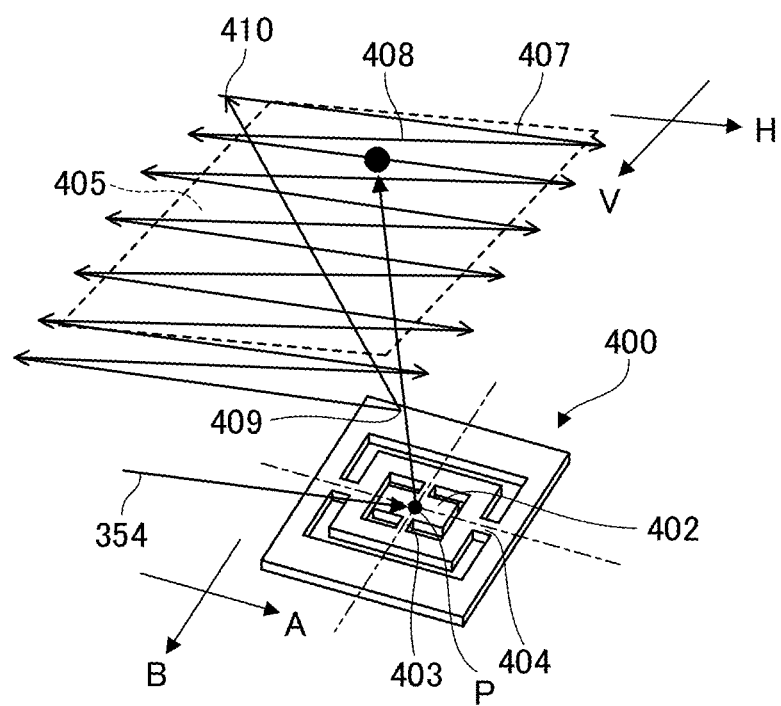
FIG. 10 is a diagram for explaining a configuration of a scanning device and an irradiation range.

FIG. 10 is a diagram for explaining a configuration of the scanning device 400 and a state in which the irradiation light 354 scanned by the scanning device 400 forms an irradiation range 405 in a two-dimensional manner.

As illustrated in FIG. 10, the reflection mirror 402 is formed at the center of the scanning device 400. The scanning device 400 has a so-called gimbal structure that has a torsion bar 403 for causing the reflection mirror 402 to swing around a vertical axis (B axis) and a torsion bar 404 for causing the reflection mirror 402 to swing around a horizontal axis (A axis).

The scanning device 400 has an actuator that drives the reflection mirror 402 around the vertical axis (B axis) and uses an electromagnetic force, an electrostatic force, or the like, which is not illustrated, and the reflection mirror 402 swings at a high speed due to a resonance effect of the structure. Also, the scanning device 400 has an actuator that uses an electromagnetic force, an electrostatic force, or the like that causes the reflection mirror 402 to swing around the horizontal axis (A axis) in synchronization with the swinging around the vertical axis (B axis), which is not illustrated.

In FIG. 10, the line 407 represents a going path of a light flux (scanning lines) scanned in the horizontal direction through the swinging of the reflection mirror 402 around the vertical axis (B axis), and the line 408 represents a coming path. Although the number of scanning lines is larger than that illustrated in FIG. 10 in practice, a smaller number of scanning lines are illustrated for easiness of explanation.

The scanning device 400 further causes the reflection mirror 402 to swing around the horizontal axis (A axis) in synchronization of the swinging of the reflection mirror 402 in the vertical axis (B axis) and scans the scanning lines in the vertical direction (V direction) as well. If the scanning lines reach a scanning end 409 in the vertical direction, then the scanning lines are returned to a scanning start point 410. In this manner, it is possible to form the irradiation range 405 in a two-dimensional manner by the scanning device 400 causing the reflection mirror 402 to successively swing.

FIG. 11 is a diagram illustrating a captured image and a distance image acquired in the third embodiment.

Figure 11A:
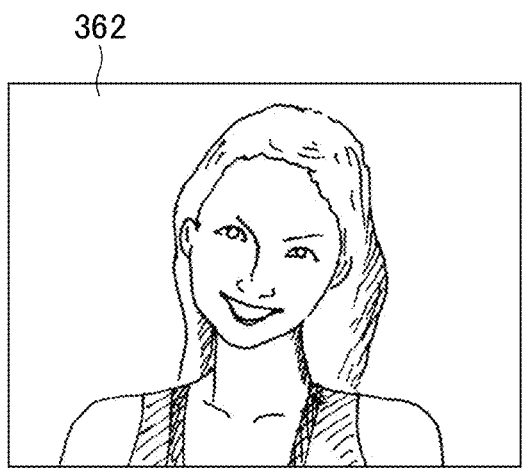
FIGS. 11A and 11B are diagrams illustrating a captured image and a distance image.
Figure 11B:
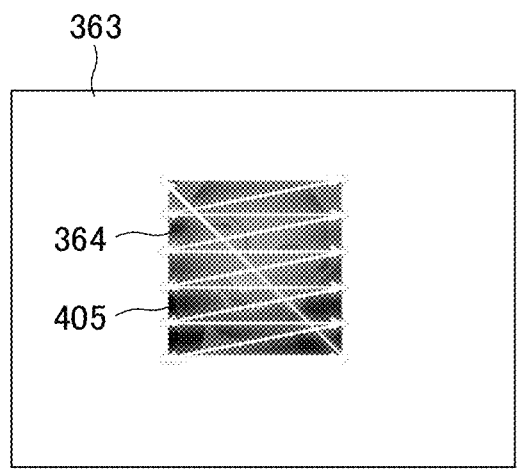

FIG. 11A illustrates an image 362 captured by the camera 100. Also, FIG. 11B illustrates a distance image 363 captured by the distance detection device 300 including the light emitting unit 301 illustrated in FIG. 9.

The light emitting unit 301 irradiates the irradiation range 405 formed by the scanning device 400 causing the reflection mirror 402 to successively swing. In this manner, the distance detection device 300 acquires an object distance map 364 near the center of an image angle corresponding to a face part of a person as an object. Therefore, it is possible to acquire an object distance with precision near the center of the image angle corresponding to the face part of the person. The camera system 1 synthesizes the captured image 362 illustrated in FIG. 11A with the distance image 363 illustrated in FIG. 11B, thereby obtaining an image expressing a three-dimensional shape (an embossing degree or the like) of the face part (object distance map 364) of the person, the distance image of which has been able to be acquired.

In comparison with the distance image 359 illustrated in FIG. 5C, the irradiation range is expanded through the driving of the scanning device 400, and the distance image 363 thus has a wider range of acquisition of corresponding distance information. Typically, the range of acquisition of the distance image 363 is determined by the type and the disposition of the light emitting unit 301 and the scanning range of the scanning device 400. It is possible to widen the irradiation range by using the light emitting unit 301 that has the light emitting element 309 and the scanning device 400 as in the third embodiment. An irradiation method in which an arbitrary range is selected within a captured image angle to set the irradiation range may be employed depending on the driving range of the scanning device 400.

Also, since the light emitting unit 301 that has the light emitting element 309 and the scanning device 400 can typically use the light emitting element such as a laser with a smaller irradiation angle as compared with the light emitting unit that has only the light emitting element, it is possible to irradiate an object at a further location. In order to further widen the irradiation range, a configuration provided with a plurality of combinations of the light emitting units 301 each having the light emitting element 309 and the scanning device 400 may be employed.

Figure 21:
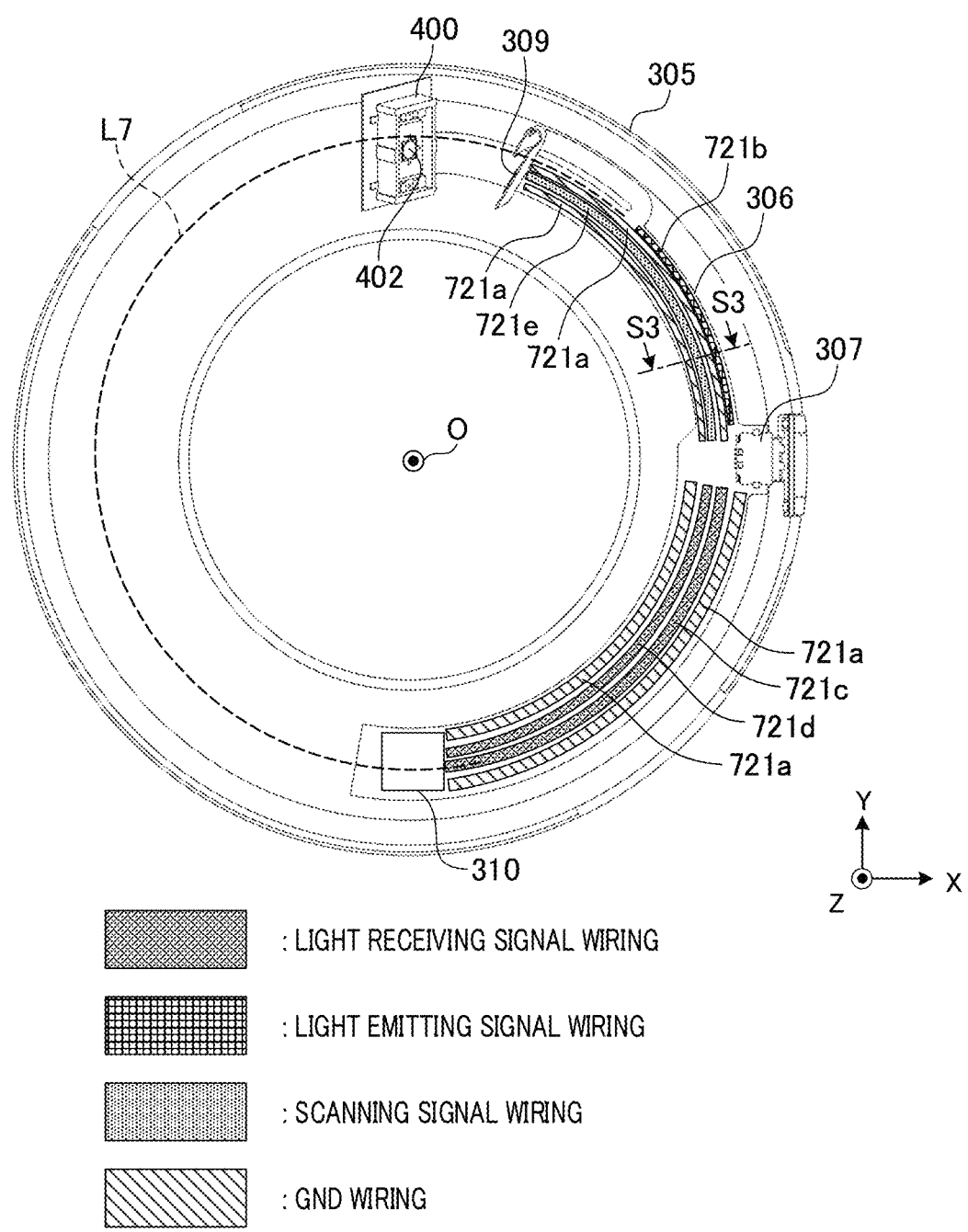
FIG. 21 is a diagram for explaining the signal wiring provided on the FPC.
Figure 22:
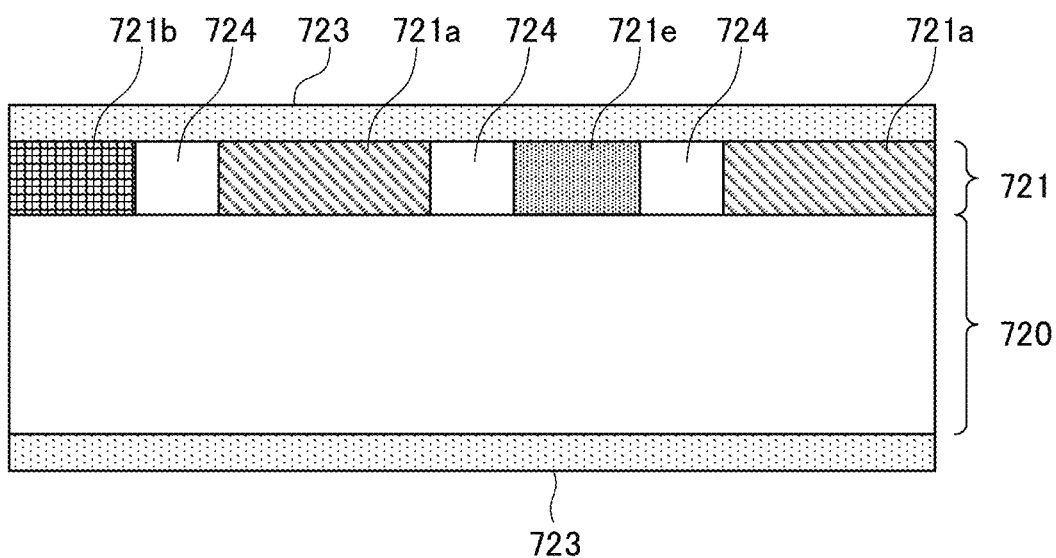
FIG. 22 is a diagram for explaining the signal wiring provided on the FPC.
Figure 22:
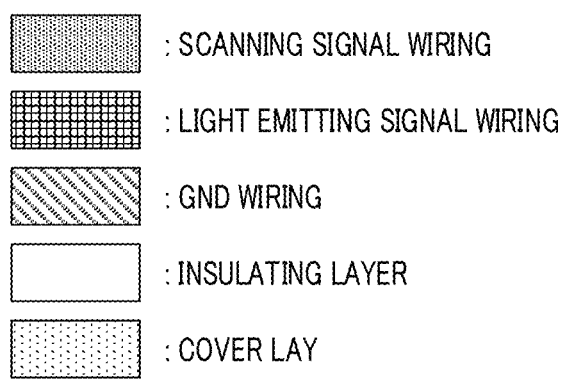
Figure 23:
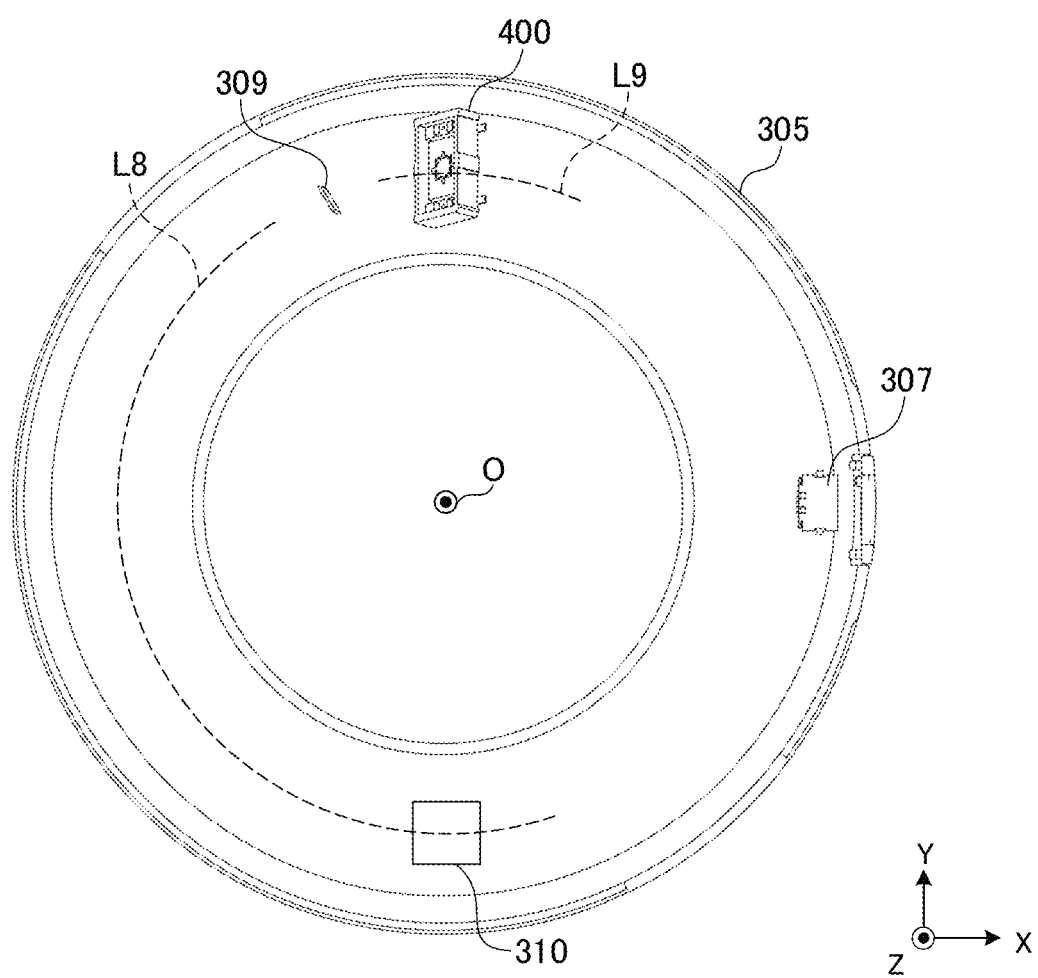
FIG. 23 is a diagram for explaining the signal wiring provided on the FPC.
Figure 24A:
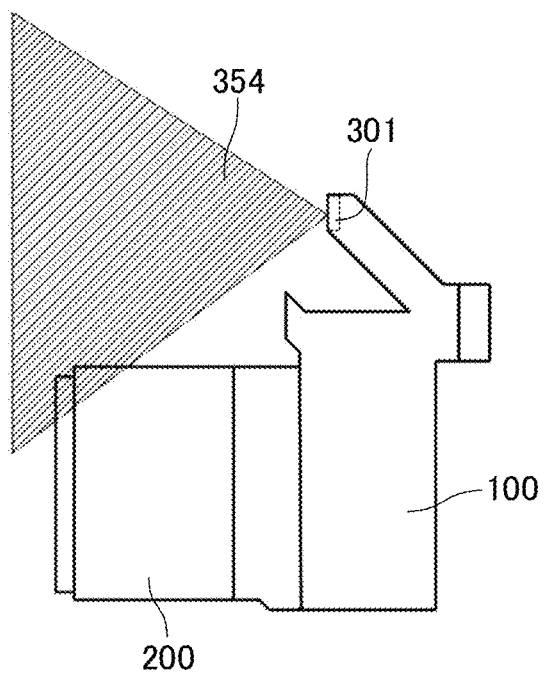
FIGS. 24A and 24B illustrate an example of a side surface of the imaging apparatus with a distance measurement light irradiator disposed therein and a distance image.
Figure 24B:
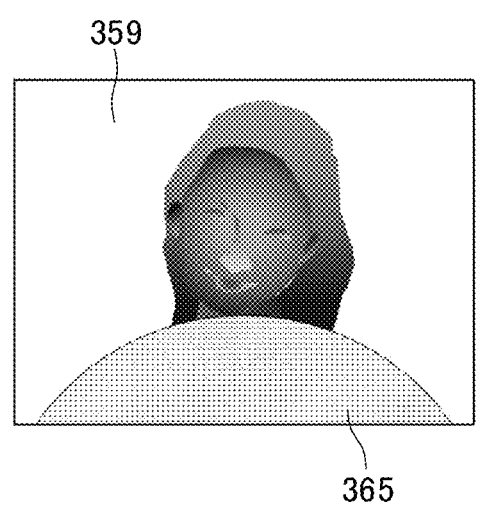

FIGS. 21 to 23 are diagrams for explaining signal wirings provided on the FPC 306 according to the third embodiment.

FIG. 21 illustrates a plan view of the signal wirings provided on the FPC 306. FIG. 22 illustrates a section along the S3-S3 line in FIG. 21. Note that the same reference signs will be applied to the same components as those in the first embodiment, and description thereof will be omitted in this embodiment. As illustrated in FIG. 21, a scanning signal wiring 721e that is a third signal wiring electrically connects the scanning device 400 to the connection terminal 307.

A rectangular pulse signal (digital signal) that is transmitted from the SUB-TOF-CPU 401 (FIG. 9) for driving the scanning device 400 is transmitted to the scanning device 400 via the scanning signal wiring 721e. The first wiring layer 721 is covered with a cover lay 723 that is an insulating member to protect the GND wiring 721a, the light emitting signal wiring 721b, the light receiving signal wirings 721c and 721d, and the scanning signal wiring 721e. Similarly to the first embodiment described above with reference to FIGS. 19 and 20, the light emitting signal wiring 721b and the light receiving signal wirings 721c and 721d are disposed so as not to overlap one another in the lamination direction of the FPC 306.

Next, a method of arranging the scanning signal wiring 721e will be described. As illustrated in FIG. 22, the scanning signal wiring 721e is surrounded from its side by the GND wiring 721a in the first wiring layer 721, and the GND wiring 721a forms a guard GND wiring for the scanning signal wiring 721e. Also, the light emitting signal wiring 721b, the GND wiring 721a, the scanning signal wiring 721e, and the GND wiring 721a are arranged in parallel in this order from the outer peripheral side of the rear cover 305. A gap 724 is provided between the wirings. In this manner, the GND wiring 721a curbs signal leakage from the scanning signal wiring 721e, and crosstalk occurring between the scanning signal wiring 721e and the light emitting signal wiring 721b is curbed. In the embodiment, the scanning signal wiring 721e is surrounded only from its side by the GND wiring 721a. The scanning signal wiring 721e may not only be surrounded from its side by the GND wiring 721a but also be surrounded from its lower side as well by the GND wiring 721a arranged in the second wiring layer 722 via the insulating layer 720.

Next, a method of arranging the light emitting signal wiring 721b will be described. As illustrated in FIG. 21, the light emitting signal wiring 721b is arranged in the clockwise direction when seen from the front side of the distance detection device 300 (when seen in the −Z direction) from the light emitting element 309 toward the connection terminal 307.

A case in which the light emitting signal wiring 721b is arranged on a wiring route (a route in the counterclockwise direction) of the line segment L7 illustrated in FIG. 21 will be assumed. In this case, the light emitting signal wiring 721b passes the position that faces the scanning device 400 in the lamination direction of the FPC 306 with the insulating layer 720 sandwiched therebetween. At this position, crosstalk occurs between the scanning device 400 or the scanning signal wiring 721e and the light emitting element signal wiring 724. Therefore, precision of the amount of irradiation light emitted from the light emitting element 309 for irradiation is degraded, or precision of the swinging operation of the reflection mirror 402 included in the scanning device 400 is degraded. As a result, precision of the distance image acquired by the distance detection device 300 is degraded. In order to prevent such crosstalk, a method of arranging the light emitting signal wiring 721b so as to be separated from the scanning signal wiring 721e in the lamination direction and the surface direction of the FPC 306 is conceivable. However, the FPC 306 is enlarged in the lamination direction and the surface direction by the amount of the separation in the arrangement of the light emitting signal wiring 721b, and the distance detection device 300 increases in size.

In this embodiment, as illustrated in FIG. 21, by providing the light emitting signal wiring 721b in the clockwise direction, it is possible to arrange the light emitting signal wiring 721b without allowing the light emitting signal wiring 721b to overlap the scanning signal wiring 721e in the lamination direction of the FPC 306 and without allowing the light emitting signal wiring 721b to be adjacent to the scanning signal wiring 721e in the surface direction.

In a case in which the scanning signal wiring 721e and the light receiving signal wirings 721c and 721d pass through the positions at which they face one another in the lamination direction of the FPC 306 similarly to the light emitting signal wiring 721b, crosstalk occurs between the scanning signal wiring 721e and the light receiving signal wirings 721c and 721d. Therefore, the scanning signal wiring 721e is arranged without overlapping the light receiving signal wirings 721c and 721d in the lamination direction of the FPC 306. It is only necessary for such an arrangement method to be carried out by replacing the light emitting signal wiring 721b with the scanning signal wiring 721e in the positional relationship between the light emitting signal wiring 721b and the light receiving signal wirings 721c and 721d illustrated in FIGS. 19 and 20, and detailed description will be omitted.

As digital signals that the distance detection device 300 has, there is a clock signal (not illustrated) for adjusting a timing of transmitting and receiving the distance image between the distance detection device 300 and the camera 100. A clock signal wiring is also one of high-speed signal wirings, and crosstalk occurring between the clock signal wiring and the light emitting signal wiring 721b is curbed by providing the guard GND wiring similarly to the scanning signal wiring 721e. It is only necessary for such an arrangement method to be carried out by replacing the scanning signal wiring 721e with the clock signal wiring in the positional relationship between the light emitting signal wiring 721b and the scanning signal wiring 721e illustrated in FIGS. 21 and 22, and detailed description will be omitted.

FIG. 23 is a disposition example of the light emitting element 309 that cannot prevent crosstalk. Illustration of the FPC 306 is omitted.

According to the distance detection device 300, there is a case in which it is not possible to prevent crosstalk between the light emitting signal wiring 721b and the light receiving signal wirings 721c and 721d or the scanning signal wiring 721e depending on the disposition of the light emitting element 309. In the disposition example illustrated in FIG. 23, the light emitting element 309 is disposed at a position further from the connection terminal 307 than the light receiving element 310 and the scanning device 400. In the disposition example, the light emitting signal wiring 721b has to be arranged through the wiring route of the line segment L8 or the line segment L9 in order to electrically connect the light emitting element 309 to the connection terminal 307.

In a case in which the light emitting signal wiring 721b is arranged through the wiring route of the line segment L8, the light emitting signal wiring 721b passes through the position at which it faces the light receiving element 310 and the light receiving signal wirings 721c and 721d in the lamination direction of the FPC 306 with the insulating layer 720 sandwiched therebetween. In a case in which the light emitting signal wiring 721b is arranged on the wiring route of the line segment L9, the light emitting signal wiring 721b passes through a position at which it faces the scanning device 400 and the scanning signal wiring 721e in the lamination direction of the FPC 306 with the insulating layer 720 sandwiched therebetween. Therefore, it is not possible to prevent crosstalk between the light emitting signal wiring 721b and the light receiving signal wirings 721c and 721d or the scanning signal wiring 721e.

On the other hand, the light emitting element 309 is disposed at a position closer to the connection terminal 307 than the light receiving element 310 and the scanning device 400 in the distance detection device 300 according to the embodiment illustrated in FIG. 21. In such disposition of the light emitting element 309, the light emitting signal wiring 721b does not pass through the position at which it faces the scanning device 400 and the scanning signal wiring 721e in the lamination direction of the FPC 306 with the insulating layer 720 sandwiched therebetween. Also, the light emitting signal wiring 721b does not pass through the position at which it faces the light receiving element 310 and the light receiving signal wirings 721c and 721d in the lamination direction of the FPC 306 with the insulating layer 720 sandwiched therebetween as well. Therefore, it is possible to prevent crosstalk between the light emitting signal wiring 721b and the light receiving signal wirings 721c and 721d or the scanning signal wiring 721e. Although the preferred embodiments of the present invention have been described above, the present invention is not limited to these embodiments, and various modifications and changes can be made within the scope of the gist thereof. It is also possible to appropriately combine the aforementioned embodiments.

For example, the distance detection device 300 illustrated in FIG. 9 may have a plurality of light emitting elements.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-141086, filed on Jul. 31, 2019, and Japanese Patent Application No. 2020-127511, filed on Jul. 28, 2020, which are hereby incorporated by reference herein in their entirety.

What is claimed is:

1. A distance detection device comprising:
a light emitting unit configured to irradiate a target region with irradiation light;
a light receiving unit configured to receive reflected light of the irradiation light from a target in the target region;
an acquisition unit configured to acquire distance information indicating a distance to the target on the basis of a time until the light receiving unit receives the reflected light after the light emitting unit performs irradiation with the irradiation light; and
a communication unit configured to communicate the distance information,
wherein the distance detection device is attached to a lens device provided in an imaging apparatus at a position at which the distance detection device surrounds the lens device, and the lens device is configured to store position information indicating the position of the distance detection device, and
wherein the imaging apparatus includes a control means configured to (1) acquire distance information indicating a distance between the distance detection device and the imaging element based on the position information stored by the lens device, and (2) correct, based on the acquired distance between the distance detection device and the imaging element, the distance to the target acquired by the acquisition unit.

2. The distance detection device according to claim 1, wherein the distance detection device is able to be attached to and detached from an end of the lens device on an object side.

3. The distance detection device according to claim 1, further comprising:
a plurality of light emitting units;
wherein the plurality of light emitting units perform irradiation with the irradiation light at mutually different timings.

4. The distance detection device according to claim 3, wherein an irradiation light axis of at least one of the light emitting units is not parallel to an optical axis of an imaging optical system provided in the lens device.

5. The distance detection device according to claim 4, wherein among the plurality of light emitting units, a first light emitting unit, a distance of which from a central axis of the distance detection device in a vertical direction is a first distance, has the irradiation light axis with a greater inclination than a second light emitting unit, a distance of which from the central axis in the vertical direction is a second distance that is shorter than the first distance.

6. The distance detection device according to claim 5, wherein the first light emitting unit is disposed further inward in a radial direction of the distance detection device than the second light emitting unit.

7. The distance detection device according to claim 5, wherein the first light emitting unit among the plurality of light emitting units irradiates the target region with the irradiation light prior to the second light emitting unit.

8. The distance detection device according to claim 1, wherein a distance from the light emitting unit to the light receiving unit is longer than a distance from the light emitting unit to a central axis of the distance detection device.

9. The distance detection device according to claim 8, wherein the light emitting unit and the light receiving unit are disposed at positions at which they face one another with the central axis sandwiched therebetween in a surface that perpendicularly intersects the central axis.

10. The distance detection device according to claim 8, further comprising:
a circuit board provided with the light emitting unit, the light receiving unit, and the communication unit,
wherein the communication unit is disposed at an intermediate position between the light emitting unit and the light receiving unit on the circuit board.

11. The distance detection device according to claim 10, further comprising:
a heat dissipating member disposed at a position at which it faces the circuit board with the central axis of the distance detection device sandwiched therebetween.

12. The distance detection device according to claim 8, wherein the communication unit included in the distance detection device is disposed in the same direction as a direction of the communication unit included in the imaging apparatus, in a surface that perpendicularly intersects an optical axis of an imaging optical system included in the lens device.

13. The distance detection device according to claim 8, wherein a distance from the light emitting unit to the communication unit included in the distance detection device is longer than a distance from the light receiving unit to the communication unit.

14. The distance detection device according to claim 1, further comprising:
a detachable unit used for attaching and detaching the distance detection device to and from the lens device, wherein the detachable unit includes
an operation unit biased outward in a radial direction of the distance detection device from an optical axis of an imaging optical system included in the lens device,
a locked member with a curved portion fitted to a notch portion of the operation unit, and
a slide member biased in a direction parallel to the optical axis and having a step difference-shaped portion formed therein, and
the locked member is locked by the slide member when the operation unit is not operated while the locking is released when the operation unit is operated.

15. The distance detection device according to claim 14, wherein the operation unit becomes able to move in a peripheral direction around the optical axis at the center by the locking of the locked member being released when the operation unit is pressed, and
the operation unit becomes unable to move in the peripheral direction by the locked member being locked when the operation unit is not pressed.

16. The distance detection device according to claim 14, wherein the locked member abuts the step difference-shaped portion formed in the slide member and is locked when the operation unit is not pressed, and
the step difference-shaped portion is separated from the locked member, and the locking is released, when the operation unit is pressed.

17. The distance detection device according to claim 14, wherein the locked member has an end formed of a flexible member.

18. The distance detection device according to claim 14, wherein the step difference-shaped portion included in the slide member has mutually different angles.

19. The distance detection device according to claim 14, further comprising:
the plurality of detachable units disposed at positions at which they face one another with the optical axis sandwiched therebetween.

20. The distance detection device according to claim 14, wherein the operation unit is disposed to extend in the radial direction beyond an outer peripheral surface of the distance detection device.

21. The distance detection device according to claim 20, wherein the operation unit is disposed in a region surrounded by an outer diameter arc from a first point to a second point on an outer periphery of the distance detection device, a first tangent line at the first point, and a second tangent line at the second point.

22. The distance detection device according to claim 1, further comprising:
a circuit board provided with a first signal wiring for electrically connecting the light emitting unit to the communication unit and a second signal wiring for electrically connecting the light receiving unit to the communication unit,
wherein the first signal wiring and the second signal wiring are provided so as not to overlap each other in a lamination direction of the circuit board.

23. The distance detection device according to claim 1, further comprising: a scanning unit configured to scan the irradiation light from the light emitting unit.

24. The distance detection device according to claim 23, further comprising:
a circuit board including a first signal wiring for electrically connecting the light emitting unit to the communication unit, a second signal wiring for electrically connecting the light receiving unit to the communication unit, and a third signal wiring for electrically connecting the scanning unit to the communication unit,
wherein the first signal wiring, the second signal wiring, and the third signal wiring are provided so as not to overlap each other in a lamination direction of the circuit board.

25. The distance detection device according to claim 24, wherein the light emitting unit is disposed at a position closer to the communication unit than the scanning unit and the light receiving unit.

26. The distance detection device according to claim 1, characterized in that the light receiving unit of the distance detection device and an imaging unit of the imaging apparatus are disposed at different positions in the irradiation light axis direction.

27. The distance detection device according to claim 1, characterized in that the light receiving unit of the distance detection device is disposed further on the object side in the irradiation light axis direction than an imaging unit of the imaging apparatus.

28. The distance detection device according to claim 1, characterized in that the imaging apparatus is provided with a control unit that records distance information indicating a distance between the distance detection device and the imaging apparatus that is calculated based on the projection amount information, which the lens device stores, as correction values.

29. The distance detection device according to claim 28, characterized in that the control unit records, as the distance information indicating the distance to the object, a value produced by adding the correction value to distance information that has been acquired by the distance detection device.

30. The distance detection device according to claim 29, characterized in that the control unit records a movable amount that the lens device advances and retracts each time the lens device advances or retracts in the irradiation light axis direction.

31. The distance detection device according to claim 30, characterized in that the control unit adds the correction value to the distance information that has been acquired by the distance detection device, and records the value for which the movable amount has been adjusted as distance information indicating the distance to the object.

32. The distance detection device according to claim 1, wherein the light emitting unit and the light receiving unit are disposed on opposite sides of an optical axis of the imaging apparatus.

33. The distance detection device according to claim 1, wherein the acquired distance information indicating the distance between the distance detection device and the imaging element is based on a position of a light receiving lens of the distance detection device.

* * * * *